(12) United States Patent
Ogawa et al.

(10) Patent No.: US 10,075,957 B2
(45) Date of Patent: Sep. 11, 2018

(54) TERMINAL COMMUNICATION APPARATUS AND COMMUNICATION METHOD

(71) Applicant: SUN PATENT TRUST, New York, NY (US)

(72) Inventors: Yoshihiko Ogawa, Kanagawa (JP); Seigo Nakao, Singapore (SG); Daichi Imamura, Beijing (CN); Akihiko Nishio, Osaka (JP); Masayuki Hoshino, Kanagawa (JP); Katsuhiko Hiramatsu, Kanagawa (JP); Kenichi Miyoshi, Kanagawa (JP); Yasuaki Yuda, Kanagawa (JP); Sadaki Futagi, Ishikawa (JP); Takashi Iwai, Ishikawa (JP)

(73) Assignee: Sun Patent Trust, New York, NY (US)

( * ) Notice: Subject to any disclaimer, the term of this patent is extended or adjusted under 35 U.S.C. 154(b) by 77 days.

(21) Appl. No.: 15/149,601

(22) Filed: May 9, 2016

(65) Prior Publication Data

US 2016/0255635 A1    Sep. 1, 2016

Related U.S. Application Data

(63) Continuation of application No. 14/457,783, filed on Aug. 12, 2014, now Pat. No. 9,370,007, which is a
(Continued)

(30) Foreign Application Priority Data

Oct. 20, 2008  (JP) ................................. 2008-269982
Jan. 29, 2009  (JP) ................................. 2009-018285

(51) Int. Cl.
*H04L 1/00*  (2006.01)
*H04L 5/00*  (2006.01)
(Continued)

(52) U.S. Cl.
CPC ....... *H04W 72/0453* (2013.01); *H04L 1/0042* (2013.01); *H04L 5/0039* (2013.01);
(Continued)

(58) Field of Classification Search
CPC ....... H04L 5/001; H04L 5/0055; H04W 72/12
See application file for complete search history.

(56) References Cited

U.S. PATENT DOCUMENTS 5,914,933 A   6/1999 Cimini
7,639,660 B2*  12/2009 Kim ...................... H04L 1/005
                                                                370/208
(Continued)

FOREIGN PATENT DOCUMENTS

JP   2007-36627    2/2007
JP   2008-53865    3/2008
WO   2006/137708   12/2006

OTHER PUBLICATIONS

International Search Report dated Dec. 15, 2009.
(Continued)

*Primary Examiner* — Ayaz Sheikh
*Assistant Examiner* — Debebe Asefa
(74) *Attorney, Agent, or Firm* — Dickinson Wright, PLLC

(57) ABSTRACT

Disclosed are a wireless communication base station device and a division number determination method that improve the frequency diversity effect while maintaining channel estimation accuracy regardless of the number of divisions in the frequency domain of a transmission signal from a wireless communication terminal device. A determination unit determines the number of divisions in the frequency domain of a transmission signal from a wireless communication terminal device. Here, the determination unit increases the number of divisions in the frequency domain of the transmission signal from the wireless communication
(Continued)

terminal device as the number of pilot blocks included in the transmission signal increases. In addition, a scheduling unit schedules allocation to the frequency resources of the divided transmission signal according to the number of divisions determined by the determination unit.

6 Claims, 16 Drawing Sheets

Related U.S. Application Data continuation of application No. 13/124,811, filed as application No. PCT/JP2009/005381 on Oct. 15, 2009, now Pat. No. 8,848,632.

(51) Int. Cl.
  *H04L 25/02* (2006.01)
  *H04L 25/03* (2006.01)
  *H04L 27/26* (2006.01)
  *H04W 72/04* (2009.01)

(52) U.S. Cl.
  CPC ........ *H04L 5/0048* (2013.01); *H04L 25/0226* (2013.01); *H04L 27/2602* (2013.01); *H04L 1/0061* (2013.01); *H04L 5/0023* (2013.01); *H04L 25/03159* (2013.01)

(56) References Cited

U.S. PATENT DOCUMENTS

| 8,018,898 | B2 | 9/2011 | Ofuji |
| 8,285,294 | B2 | 10/2012 | Baldemair |
| 8,385,284 | B2 | 2/2013 | Wengerter |
| 2002/0136276 | A1 | 9/2002 | Franceschini et al. |
| 2009/0122752 | A1 | 5/2009 | Nishio et al. |
| 2010/0067479 | A1 | 3/2010 | Choi |
| 2010/0098006 | A1 | 4/2010 | Golitschek Edler Von Elbwart et al. |
| 2010/0098012 | A1 | 4/2010 | Bala et al. |
| 2010/0232374 | A1 | 9/2010 | Ofuji |
| 2011/0222525 | A1 | 9/2011 | Kishigami |
| 2011/0268072 | A1* | 11/2011 | Lee ..................... H04B 7/0452 370/329 |
| 2011/0292916 | A1 | 12/2011 | Shirakabe |

OTHER PUBLICATIONS

3GPP TSG RAN #53, "Proposals on PHY related aspects in LTE Advanced," NEC, R1-081782, Kansas City, MO, May 5-9, 2008, pp, 1-12.

Y. Ofuji, et al., "Frequency Domain Channel-Dependent Scheduling with Group-wised Allocation of Transmission Bandwidth of Pilot Channel for CQI Measurement in Single-Carrier FDMA-Based Evolved UTRA Uplink," IEICE Technical Report, RCS2006-154, Oct. 2006, pp. 125-130.

3GPP TSG-RAN1 #54bis, "Short Study on PAPR property of clustered DFT-S-OFDM," Fujitsu, R1-083781, Czech Republic, Sep. 29-Oct. 3, 2008, pp. 1-8.

3GPP TSG-RAN WG1 #54, "Considerations on Uplink Multiple Access Schemes for LTE-A," ZTE, R1-082833, Jeju, Korea, Aug. 18-22, 2008, pp. 1-7.

Supplementary European Search Report dated Jun. 17, 2013.

3GPP TSG RAN WG1 Meeting #54, "Uplink Muitiple Access Scheme for LTE-Advanced," Sharp, R1-082787, Jeju, Korea, Aug. 18-22, 2006, pp. 1-4.

3GPP TSG RAN1#53-bis, "UL Access Scheme for LTE-Advanced," NEC, R1-082365, Warsaw, Poland, Jun. 30-Jul. 4, 2008, pp. 1-10.

3GPP TSG RAN1#54bis, "Uplink Access Scheme for LTE-Advanced in BW=20MHz," NEC, R1-083493, Prague, Czech Republic, Sep. 29-Oct. 3, 2008, pp. 1-16.

Z. Xu, et al., "Power Allocation for Muiti-band OFDM UWB Communication Networks," 2004 IEEE 60$^{th}$ Vehicular Technology Conference, vol. 1, XP 010786686, Sep. 26, 2004, 368-372.

English translation of the Office Action dated Jan. 15, 2013 for the corresponding Russian Patent Application.

Extended European Search Report dated Jan. 13, 2016.

3GPP RAN IMT—Advariced Workshop "NEC's proposals for LTE advanced," NEC, REV-080022, XP008140926, Apr. 7, 2008, pp. 1-27.

* cited by examiner

| NUMBER OF PILOT BLOCKS | NUMBER OF SD'S (DIVISION PATTERN A) | NUMBER OF SD'S (DIVISION PATTERN B) | NUMBER OF SD'S (DIVISION PATTERN C) |
|---|---|---|---|
| SMALL | 1 | 2 | 3 |
| MEDIUM | 1 | 3 | 4 |
| LARGE | 1 | 4 | 5 |

FIG. 4

| NUMBER OF PILOT BLOCKS | SIGNAL #1 | SIGNAL #2 | SIGNAL #3 |
|---|---|---|---|
| SMALL | SD=1 | SD=2, Δ=A[RB] | SD=2, Δ=B[RB] |

FIG.7

| MINIMUM BANDWIDTH | NUMBER OF LAYERS | | | |
|---|---|---|---|---|
| | 1 | 2 | 3 | 4 |
| 2RB~20RB | 1 (RB) | 2 | 3 | 4 |
| 21RB~50RB | 3 | 4 | 5 | 6 |
| TRANSMISSION BANDWIDTH (RB) 51RB~100RB | 5 | 6 | 7 | 8 |

FIG.13

| MAXIMUM NUMBER | | | | |
|---|---|---|---|---|
| | 1 | 2 | 3 | 4 |
| TRANSMISSION BANDWIDTH (RB) | 2RB~20RB | 2 (CLUSTERS) | 2 | 3 | 4 |
| | 21RB~50RB | 4 | 3 | 2 | 1 |
| | 51RB~100RB | 6 | 5 | 4 | 3 |

FIG.15

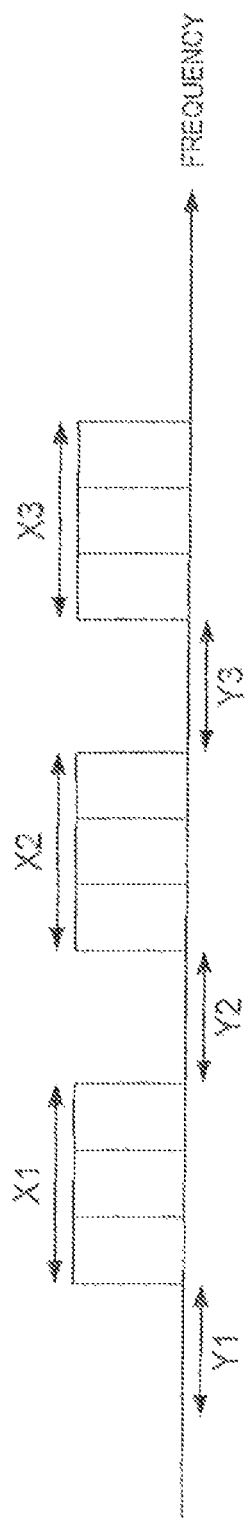

TERMINAL COMMUNICATION APPARATUS AND COMMUNICATION METHOD

CROSS REFERENCE TO RELATED APPLICATIONS

This is a continuation application of application Ser. No. 14/457,783 filed Aug. 12, 2014, which is a continuation application of application Ser. No. 13/124,811 filed Apr. 18, 2011, which is a 371 application of PCT/JP2009/005381 filed Oct. 15, 2009, which is based on Japanese Application No. 2008-269982 filed Oct. 20, 2008 and Japanese Application No. 2009-018285 filed Jan. 29, 2009, the entire contents of each of which are incorporated by reference herein.

TECHNICAL FIELD

The present invention relates to a radio communication base station apparatus and division number decision method.

BACKGROUND ART

In LTE-Advanced, which is an extended edition of 3GPP LTE (3rd Generation Partnership Project Long Term Evolution), the use of Multi Carrier (MC) transmission in an uplink has been studied in addition to the use of Single Carrier (SC) transmission.

In SC transmission, a transmission signal is transmitted using consecutive frequency bands. Therefore, in SC transmission, channel correlation between frequency bands to which a transmission signal is mapped is high, and furthermore, transmission power can be concentrated in consecutive frequency bands. Consequently, by filtering a channel estimate estimated based on a pilot signal, a significant noise averaging effect can be obtained, and satisfactory channel estimation accuracy is obtained.

On the other hand, in MC transmission, a transmission signal is transmitted using nonconsecutive frequency bands. Therefore, in MC transmission, a transmission signal can be assigned to a wider frequency band than in the case of SC transmission, enabling a greater frequency diversity effect to be obtained than with SC transmission.

Also, in LTE-Advanced, DFT-s-OFDM (Discrete Fourier Transform spread Orthogonal Frequency Division Multiplexing) with SDC (Spectrum Division Control) has been studied as a transmitting method whereby switching is performed adaptively between SC transmission and MC transmission according to the communication environment of a mobile station (see Non-Patent Literature 1, for example).

FIG. 1 is a block diagram showing an outline configuration of a DFT-s-OFDM with SDC type of radio communication terminal apparatus (hereinafter referred to as "terminal"). As shown in FIG. 1, a terminal performs DFT processing on a data signal, and adds a CP (Cyclic Prefix) before transmission. Here, switching between SC transmission and MC transmission can be performed by having the subcarrier mapping section shown in FIG. 1 control the method of mapping a data signal in the frequency domain. Specifically, SC transmission is used if the number of data divisions in the frequency domain (hereinafter referred to as the number of SD's (Spectrum Divisions)) is 1, and MC transmission is used if the number of SD's is 2 or more. A radio communication base station apparatus (hereinafter referred to as "base station") can switch adaptively between SC transmission and MC transmission by controlling the number of SD's according to the communication environment of a terminal.

An advantage of DFT-s-OFDM with SDC is that the CM (Cubic Metric) or PAPR (Peak-to-Average Power Ratio) in MC transmission can be lowered compared with OFDMA (Orthogonal Frequency Division Multiple Access). By this means, the MC transmission application range can be widened, and coverage performance can be improved.

CITATION LIST

Non-Patent Literature

NPL 1
NEC, R1-081752, "Proposals on PHY related aspects in LTE Advanced," 3GPP TSG RAN1 #53, Kansas City, Mo., USA, 5-9 May, 2008

SUMMARY OF INVENTION

Technical Problem

A data signal and pilot signal are time-multiplexed in a transmission signal transmitted from a terminal. In the following description, a block that includes a pilot signal is called a pilot block. That is to say, a transmission signal includes one or a plurality of pilot blocks. A terminal divides the plurality of pilot blocks included in a transmission signal, and generates a plurality of pilot block groups. Here, a group of pilot blocks is called a cluster, for example. For instance, a terminal may generate two clusters each comprising a group of three pilot blocks by dividing six pilot blocks included in a transmission signal into two.

Within a coherent bandwidth, which is a bandwidth in which there is mutual correlation with a signal propagation characteristic, the larger the number of pilot blocks, the greater is the noise averaging effect of filtering, and therefore the higher is the channel estimation accuracy obtained. However, in DFT-s-OFDM with SDC, the larger the number of SD's, the more finely a transmission signal is divided and the smaller is the number of pilot blocks composing each cluster, and thus the smaller is the number of pilot blocks mapped within the coherent bandwidth. Consequently, only a small noise averaging effect is obtained, and channel estimation accuracy declines.

On the other hand, the smaller the number of SD's, the larger is the number of pilot blocks composing each cluster, and thus the larger is the number of pilot blocks mapped within the coherent bandwidth. However, the smaller the number of SD's, the smaller is the number of clusters generated by division, and thus pilot blocks can no longer be mapped over a wide bandwidth, and the frequency diversity effect decreases.

This will now be explained in more specific terms. In FIG. 2A and FIG. 2B, a terminal transmits a transmission signal composed of six pilot blocks (for example, pilot blocks of six subcarriers). In FIG. 2A, the number of SD's is 2, and therefore the terminal divides the six pilot blocks into two, and performs mapping to a frequency band with three pilot blocks (pilot blocks of three subcarriers) as one cluster. In FIG. 2B, the number of SD's is 3, and therefore the terminal divides the six pilot blocks into three, and performs mapping to a frequency band with two pilot blocks (pilot blocks of two subcarriers) as one cluster. Here, as shown in FIG. 2A and FIG. 2B, pilot blocks included in one cluster are mapped within a coherent bandwidth. Assuming that mutually different clusters are mapped separated by frequency interval Δ wider than a coherent bandwidth, signal propagation characteristic correlation between pilot blocks included in different clusters is low.

Comparing FIG. 2A (number of SD's: 2) and FIG. 2B (number of SD's: 3), the number of pilot blocks mapped within a coherent bandwidth is three in FIG. 2A as compared with two in FIG. 2B. That is to say, in FIG. 2B (number of SD's: 3), channel estimation is performed using fewer pilot blocks than in FIG. 2A (number of SD's: 2), and therefore channel estimation accuracy is lower than in FIG. 2A (number of SD's: 2).

On the other hand, in FIG. 2A two clusters generated by dividing a transmission signal into two are arranged in a distributed fashion in the frequency domain, while in FIG. 2B three clusters generated by dividing a transmission signal into three are arranged in a distributed fashion in the frequency domain. That is to say, in FIG. 2A (number of SD's: 2), the number of SD's is smaller than in FIG. 2B (number of SD's: 3), and therefore the frequency diversity effect is smaller than in FIG. 2B (number of SD's: 3).

Thus, in DFT-s-OFDM with SDC, either channel estimation accuracy or the frequency diversity effect decreases depending on the number of SD's.

It is an object of the present invention to provide a radio communication base station apparatus and division number decision method that enable a frequency diversity effect to be improved while maintaining channel estimation accuracy, regardless of the number of SD's.

Solution to Problem

A radio communication base station apparatus of the present invention employs a configuration having a decision section that decides the number of divisions in the frequency domain of a transmission signal from a radio communication terminal apparatus, and a scheduling section that schedules allocation to a frequency resource of the transmission signal that is divided into the number of divisions; wherein the decision section increases the number of divisions in proportion to the number of pilot blocks included in the transmission signal.

A division number decision method of the present invention decides the number of divisions in the frequency domain of a transmission signal from a radio communication terminal apparatus, and provides for the number of divisions to be increased in proportion to the number of pilot blocks included in the transmission signal.

Advantageous Effects of Invention

The present invention enables a frequency diversity effect to be improved while maintaining channel estimation accuracy, regardless of the number of SD's.

BRIEF DESCRIPTION OF DRAWINGS

FIG. 4 is a drawing showing the association between the number of pilot blocks and the number of SD's according to Embodiment 1 of the present invention;

FIG. 7 is a drawing showing the association between the number of pilot blocks and the number of SD's and frequency interval according to Embodiment 2 of the present invention;

FIG. 13 is a drawing showing cluster minimum bandwidths according to the number of layers and transmission bandwidth;

FIG. 15 is a drawing showing maximum numbers of clusters according to the number of layers and transmission bandwidth; and FIG. 16 is a drawing showing another control information reporting method of the present invention.

DESCRIPTION OF EMBODIMENTS

Now, embodiments of the present invention will be described in detail with reference to the accompanying drawings.

(Embodiment 1)

In this embodiment, the larger the number of pilot signals included in a transmission signal, the larger the number of SD's is made.

The configuration of base station 100 according to this embodiment will now be described using FIG. 3.

Figure 1:
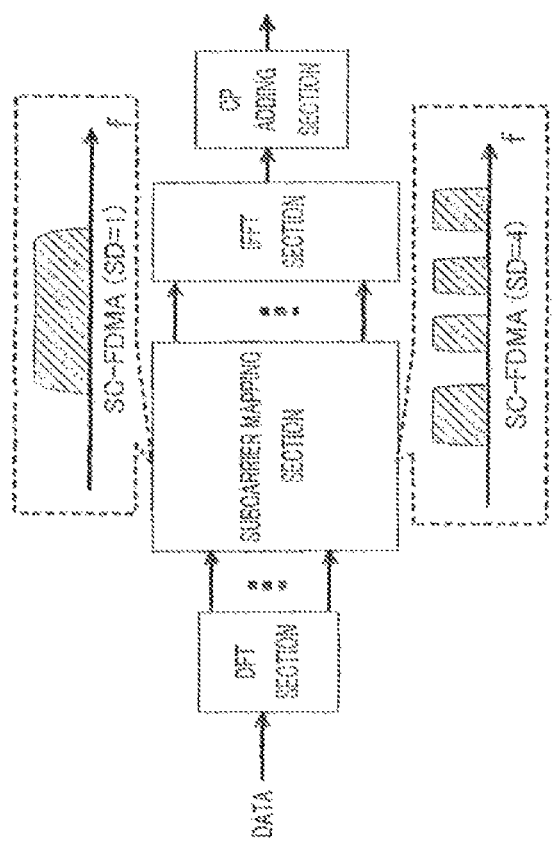
FIG. 1 is a block diagram showing an outline configuration of a DFT-s-OFDM with SDC type of terminal.
Figure 2A:
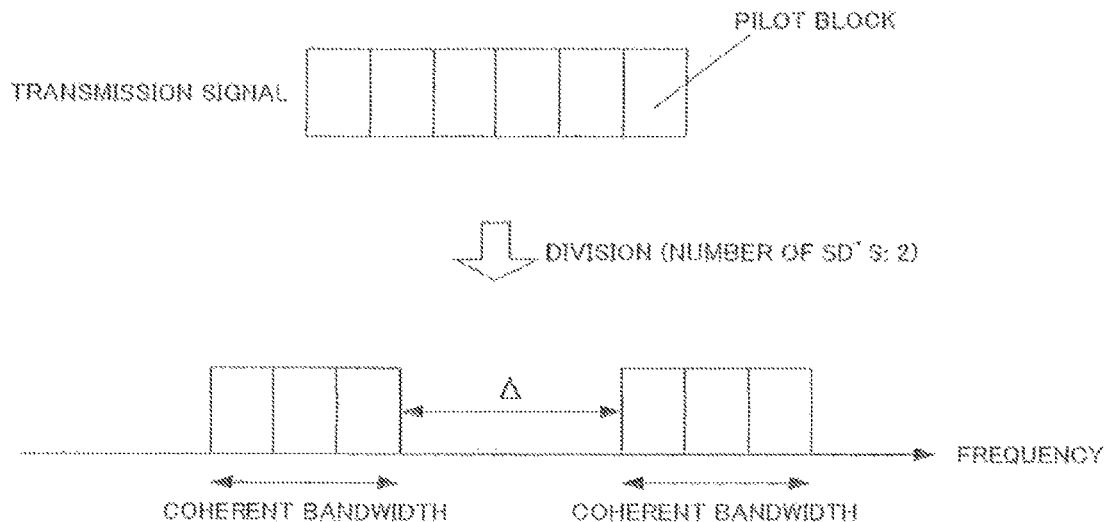
FIG. 2A is a drawing showing conventional transmission signal division processing.
Figure 2B:
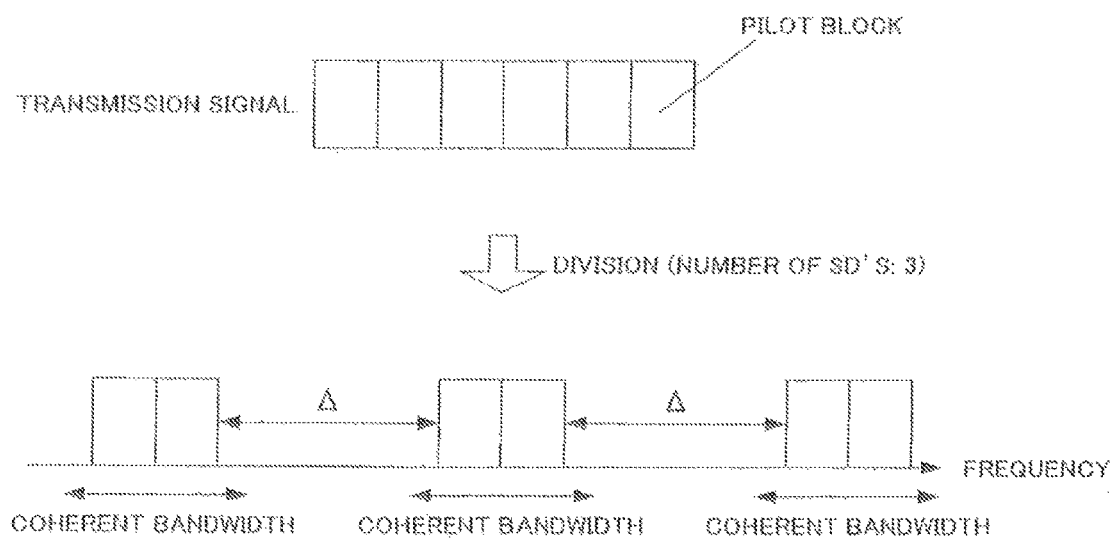
FIG. 2B is a drawing showing conventional transmission signal division processing.
Figure 3:
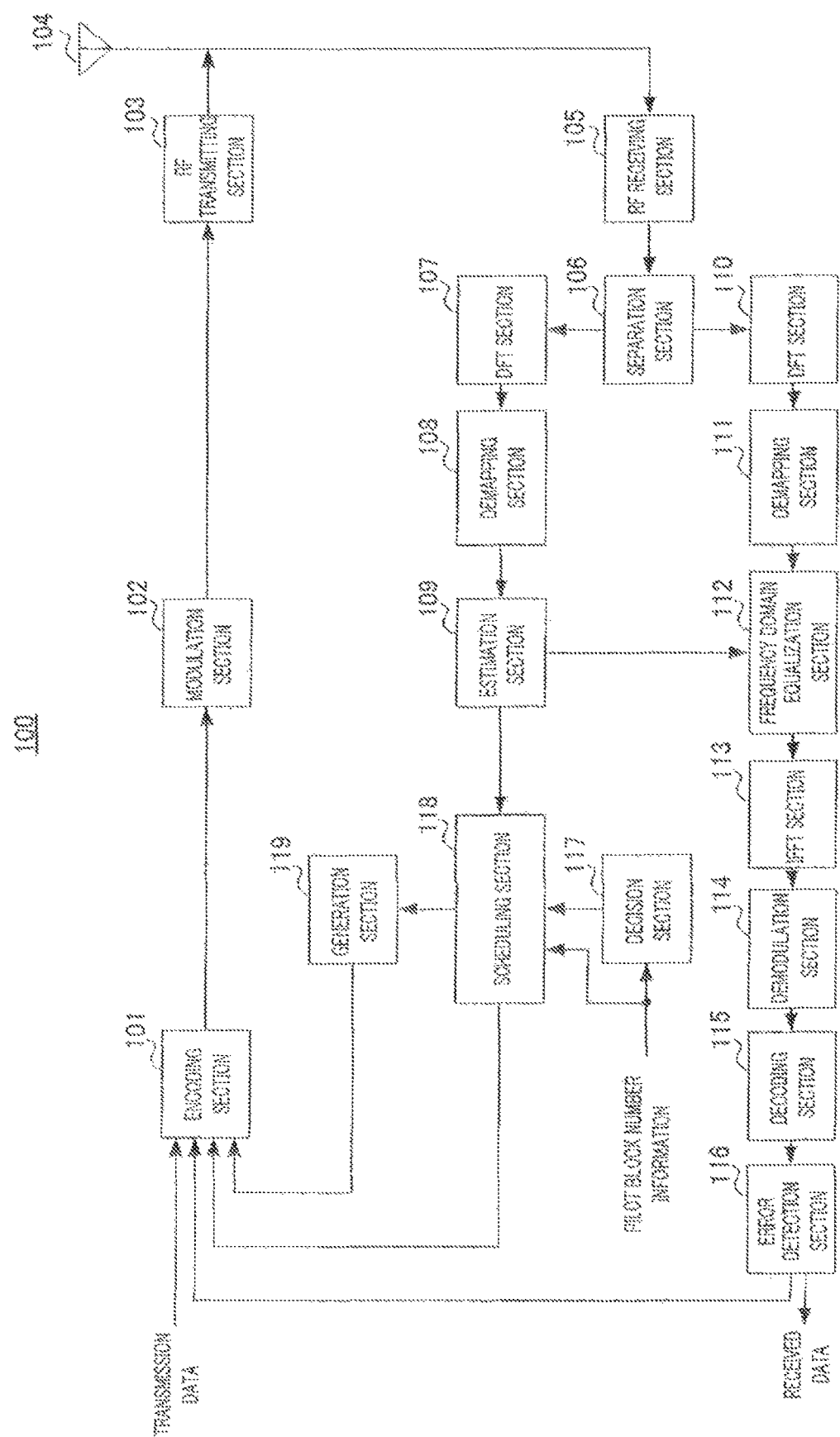
FIG. 3 is a block diagram showing the configuration of a base station according to Embodiment 1 of the present invention.

The following are input to encoding section 101 of base station 100 shown in FIG. 3: transmission data (downlink data), a response signal (ACK signal or NACK signal) from error detection section 116, "Grant" indicating resource allocation information of each terminal from scheduling section 118, and division information indicating a transmission signal division pattern of each terminal from generation section 119. Control information comprises a response signal, "Grant," and division information. Encoding section 101 encodes the transmission data and control information, and outputs encoded data to modulation section 102.

Modulation section 102 modulates encoded data input from encoding section 101, and outputs a post-modulation signal to RF transmitting section 103.

RF transmitting section 103 executes transmission processing such as D/A conversion, up-conversion, and amplification on a signal input from modulation section 102, and performs radio transmission of a signal on which transmission processing has been executed to each terminal from antenna 104.

RF receiving section 105 executes reception processing such as down-conversion and A/D conversion on a signal from each terminal received via antenna 104, and outputs a signal on which reception processing has been executed to separation section 106.

Separation section 106 separates a signal input from RF receiving section 105 into a pilot signal and data signal. Then separation section 106 outputs a pilot signal to DFT section 107, and outputs a data signal to DFT section 110.

DFT section 107 executes DFT processing on a pilot signal input from separation section 106, and converts the signal from a time-domain signal to a frequency-domain signal. Then DFT section 107 outputs a pilot signal that has been converted to the frequency domain to demapping section 108.

Demapping section 108 extracts from a frequency-domain pilot signal input from DFT section 107 a pilot signal of a part corresponding to a transmission band of each terminal. Then demapping section 108 outputs each extracted pilot signal to estimation section 109.

Based on a pilot signal input from demapping section 108, estimation section 109 estimates a channel frequency fluctuation (channel frequency response) estimate and reception quality estimate. Then estimation section 109 outputs a channel frequency fluctuation estimate to frequency domain equalization section 112, and outputs a reception quality estimate to scheduling section 118.

On the other hand, DFT section 110 executes DFT processing on a data signal input from separation section 106, and converts the signal from a time-domain signal to a frequency-domain signal. Then DFT section 110 outputs a data signal that has been converted to the frequency domain to demapping section 111.

Demapping section 111 extracts from a signal input from DFT section 110 a data signal of a part corresponding to a transmission band of each terminal. Then demapping section 111 outputs each extracted signal to frequency domain equalization section 112.

Frequency domain equalization section 112 executes equalization processing on a data signal input from demapping section 111 using a channel frequency fluctuation estimate input from estimation section 109. Then frequency domain equalization section 112 outputs a signal on which equalization processing has been executed to IFFT section 113.

IFFT section 113 executes IFFT processing on a data signal input from frequency domain equalization section 112. Then IFFT section 113 outputs a signal on which IFFT processing has been executed to demodulation section 114.

Demodulation section 114 executes demodulation processing on a signal input from IFFT section 113, and outputs a signal on which demodulation processing has been executed to decoding section 115.

Decoding section 115 executes decoding processing on a signal input from demodulation section 114, and outputs a signal on which decoding processing has been executed (a decoded bit string) to error detection section 116.

Error detection section 116 performs error detection on a decoded bit string input from decoding section 115. Error detection section 116 performs error detection using a CRC, for example. Error detection section 116 generates a NACK signal as a response signal if the error detection result is that there is an error in the decoded bits, or generates an ACK signal as a response signal if the error detection result is that there is no error in the decoded bits. Then error detection section 116 outputs the generated response signal to encoding section 101. If there is no error in the decoded bits, error detection section 116 also outputs a data signal as received data.

Pilot block number information indicating the number of pilot blocks in a terminal's transmission signal is input to decision section 117 and scheduling section 118.

As shown in FIG. 4, decision section 117 stores beforehand a plurality of division patterns (in FIG. 4, division pattern A, division pattern B, and division pattern C) for each of which the association between the number of pilot blocks and the number of SD's is different. Based on the number of pilot blocks indicated by input pilot block number information, decision section 117 decides the number of SD's that is the number of divisions in the frequency domain of a transmission signal from a terminal, using one of the plurality of division patterns. Here, for example, decision section 117 uses one of the plurality of division patterns based on the reception quality of a radio channel between decision section 117's base station and a terminal (here, terminal 200). Also, the larger the number of pilot blocks included in a transmission signal, the larger decision section 117 makes the number of SD's. Then decision section 117 outputs SD number information indicating the decided number of SD's to scheduling section 118.

Scheduling section 118 schedules allocation of a transmission signal transmitted from each terminal to a transmission band (frequency resource) in accordance with a reception quality estimate input from estimation section 109 and SD number information input from decision section 117. For example, based on a reception quality estimate, scheduling section 118 schedules a transmission signal divided into the number of SD's indicated by the SD number information (a transmission signal comprising the number of pilot blocks indicated by the pilot block number information) to a frequency resource. Then scheduling section 118 outputs "Grant" indicating the scheduling result (for example, the start position and bandwidth of a frequency resource to which the transmission signal is allocated) to encoding section 101, and outputs SD number information and pilot block number information to generation section 119.

In the same way as decision section 117, generation section 119 stores beforehand the plurality of division patterns shown in FIG. 4. Based on the number of SD's indicated by SD number information input from scheduling section 118, and the number of pilot blocks indicated by pilot block number information, generation section 119 identifies a division pattern used by decision section 117, and generates division information indicating the identified division pattern. Then generation section 119 outputs the generated division information to encoding section 101. By this means, a division pattern is reported to each terminal. In base station 100, a division pattern selected by decision section 117 may be output to generation section 119, and generation section 119 may use the division pattern input from decision section 117 to generate division information indicating the division pattern.

Next, the configuration of terminal 200 according to this embodiment will be described using FIG. 5.

Figure 5:
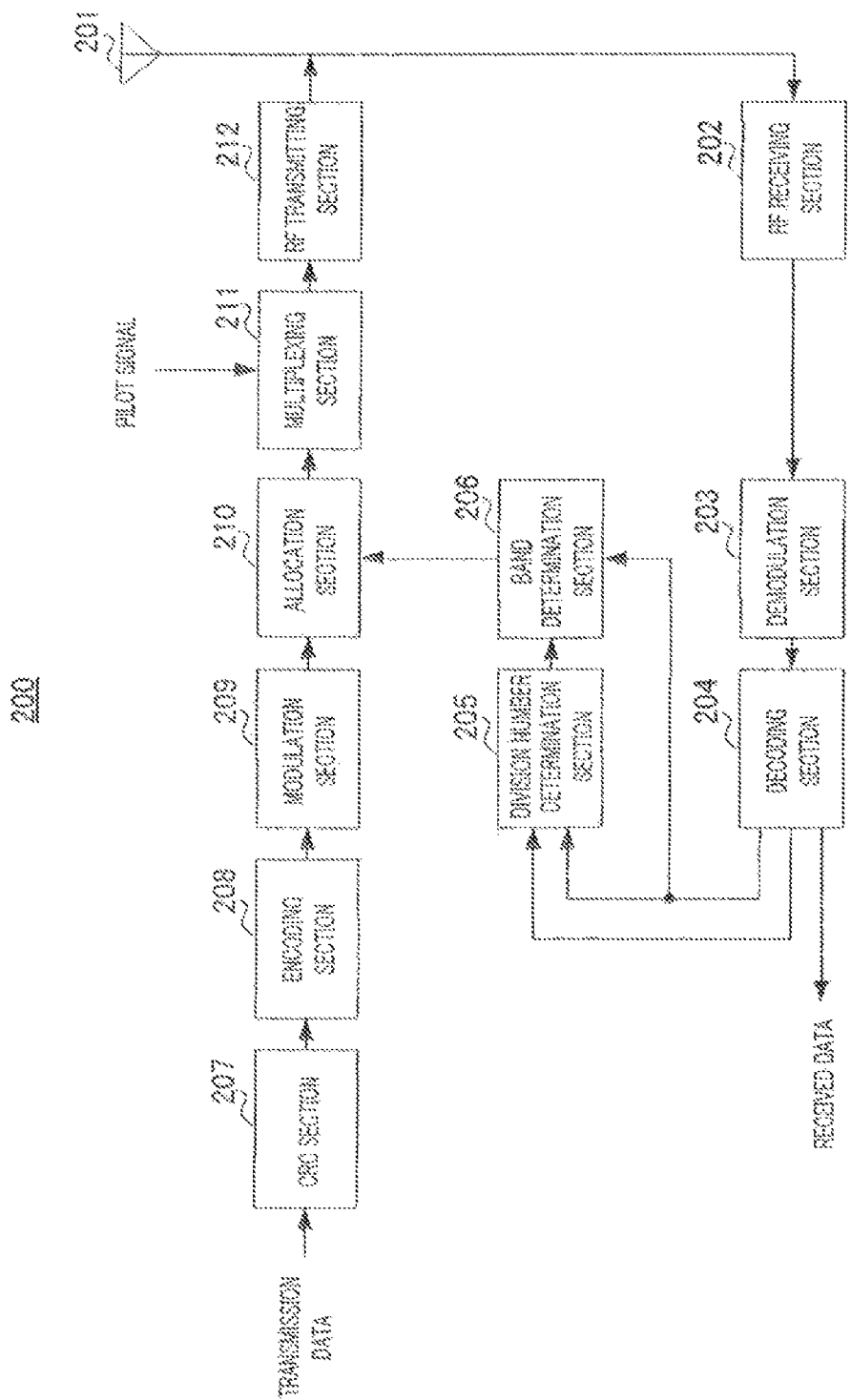
FIG. 5 is a block diagram showing the configuration of a terminal according to Embodiment 1 of the present invention.

RF receiving section 202 of terminal 200 shown in FIG. 5 executes reception processing such as down-conversion and A/D conversion on a signal received from base station 100 via antenna 201, and outputs a signal on which reception processing has been executed to demodulation section 203.

Demodulation section 203 executes equalization processing and demodulation processing on a signal input from RF receiving section 202, and outputs a signal on which this processing has been executed to decoding section 204.

Decoding section 204 executes decoding processing on a signal input from demodulation section 203, and extracts received data and control information. Here, a response signal (ACK signal or NACK signal), "Grant," and division information are included in the control information. Of the extracted control information, decoding section 204 outputs "Grant" to division number determination section 205 and band determination section 206, and outputs division information to division number determination section 205.

Division number determination section 205 stores beforehand the same plurality of division patterns (FIG. 4) as generation section 119 of base station 100. Division number determination section 205 determines the number of SD's of a transmission signal of this terminal based on "Grant" and division information input from decoding section 204. For example, of the plurality of division patterns shown in FIG. 4, division number determination section 205 determines a division pattern indicated by division information, and the number of SD's corresponding to the frequency bandwidth (that is, the number of pilot blocks) of a transmission signal of this terminal requested by "Grant." Then division number determination section 205 outputs the determined number of SD's to band determination section 206.

Band determination section 206 determines a frequency resource to which a transmission signal of this terminal is to be allocated based on "Grant" input from decoding section 204 and the number of SD's input from division number determination section 205. Then band determination section 206 outputs band information indicating the determined frequency resource to allocation section 210.

CRC section 207 performs CRC encoding on transmission data and generates CRC encoded data, and outputs the generated CRC encoded data to encoding section 208.

Encoding section 208 encodes CRC encoded data input from CRC section 207, and outputs encoded data to modulation section 209.

Modulation section 209 modulates encoded data input from encoding section 208, and outputs a post-modulation data signal to allocation section 210.

Allocation section 210 allocates a data signal input from modulation section 209 to a frequency resource (RB) based on band information input from band determination section 206. Allocation section 210 outputs a data signal allocated to an RB to multiplexing section 211.

Multiplexing section 211 performs time multiplexing of a pilot signal and the data signal input from allocation section 210, and outputs a multiplex signal to RF transmitting section 212. By this means, a transmission signal comprising a pilot block composed of a data signal and pilot signal is generated.

RF transmitting section 212 executes transmission processing such as D/A conversion, up-conversion, and amplification on a multiplex signal input from multiplexing section 211, and performs radio transmission of a signal on which transmission processing has been executed from antenna 201 to base station 100.

Next, processing performed by decision section 117 of base station 100 (FIG. 3) to decide the number of SD's will be described in detail.

As explained above, in order to obtain satisfactory channel estimation accuracy, it is necessary for a certain number of pilot blocks or more to be mapped within a coherent bandwidth, even when a transmission signal is divided. For example, assume that the number of pilot blocks necessary to obtain satisfactory channel estimation accuracy within a coherent bandwidth is three or more. In this case, in order to maintain satisfactory channel estimation accuracy even after a transmission signal has been divided, three pilot blocks should be included in each cluster generated by dividing the transmission signal. That is to say, a minimum of the number of pilot blocks with which satisfactory channel estimation accuracy is obtained within a coherent bandwidth should be mapped. Therefore, when a transmission signal is divided, the number of SD's should be decided so that a cluster comprises a minimum of three pilot blocks (that is, the number of pilot blocks with which satisfactory channel estimation accuracy is obtained). For example, the total number of pilot blocks included in a transmission signal is the number of pilot blocks per cluster generated by dividing a transmission signal (here, three)×the number of SD's. Thus, if the number of pilot blocks per cluster is fixed, the number of SD's increases in proportion to the total number of pilot blocks.

That is to say, if a certain number (here, three) is secured as the number of pilot blocks per cluster, channel estimation accuracy can be maintained even when the number of SD's increases in proportion to the number of pilot blocks included in a transmission signal. Also, the larger the number of SD's, the more the frequency diversity effect can be improved, since a plurality of clusters can be arranged in a distributed fashion in a wide band. Thus, in this embodiment, the larger the number of pilot blocks indicated by input pilot block number information, the larger decision section 117 makes the number of SD's.

Figure 6:
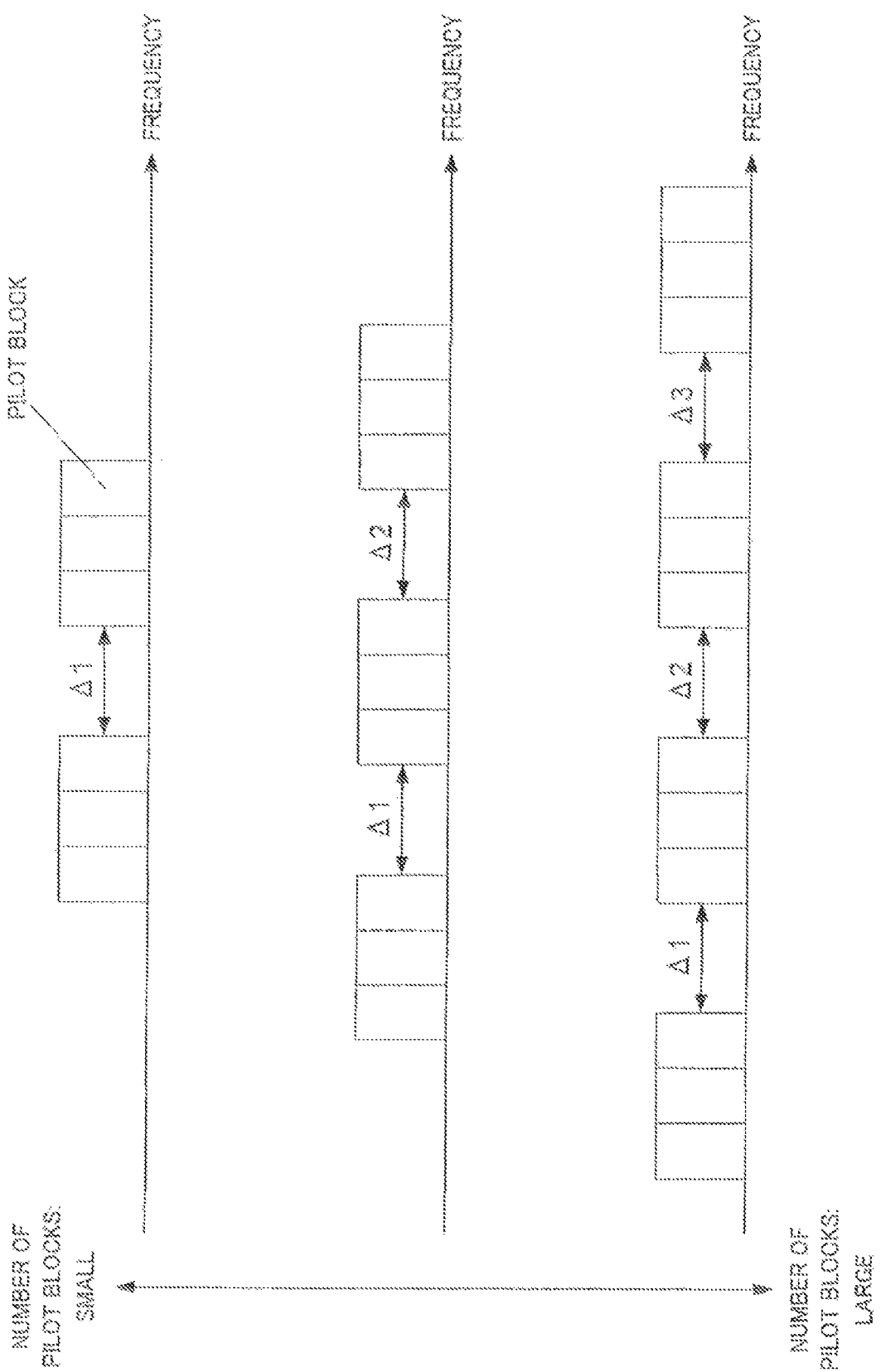
FIG. 6 is a drawing showing transmission signal division processing according to Embodiment 1 of the present invention.

In the following description, numbers of pilot blocks are classified into three categories: small, medium, and large. Specifically, as shown in FIG. 4 and FIG. 6, a case in which the number of pilot blocks is six or less is categorized as "number of pilot blocks: small," a case in which the number of pilot blocks is between seven and nine is categorized as "number of pilot blocks: medium," and a case in which the number of pilot blocks is more than nine is categorized as "number of pilot blocks: large." Also, as shown in FIG. 6, a frequency interval between clusters is denoted by any one of $\Delta 1$, $\Delta 2$, or $\Delta 3$. Here, $\Delta 1$, $\Delta 2$, and $\Delta 3$ are all values greater than the coherent bandwidth, and $\Delta 1$, $\Delta 2$, and $\Delta 3$ may all be the same value, for example. In division pattern A in FIG. 4, the number of SD's is 1 whatever the number of pilot blocks. That is to say, SC transmission with no division of a transmission signal is performed. On the other hand, with division pattern B and division pattern C in FIG. 4, MC transmission is performed.

Division pattern B shown in FIG. 4 will now be described. The larger the number of pilot blocks indicated by input pilot block number information, the larger decision section 117 makes the number of SD's. For example, when the number of pilot blocks is 6 (that is, in the "number of pilot blocks: small" case), decision section 117 decides the number of pilot blocks to be 2, as shown in FIG. 4. Similarly, when the number of pilot blocks is 9 (that is, in the "number of pilot blocks: medium" case), decision section 117 decides the number of pilot blocks to be 3, as shown in FIG. 4. And when the number of pilot blocks is 12 (that is, in the "number of pilot blocks: large" case), decision section 117 decides the number of pilot blocks to be 4, as shown in FIG. 4.

Then, when, for example, the number of pilot blocks is 6 (that is, in the "number of pilot blocks: small" case), since the number of SD's is 2, scheduling section 118 allocates a transmission signal divided into two (two clusters) in the frequency domain separated by Δ1, as shown at the top of FIG. 6. Similarly, when the number of pilot blocks is 9 (that is, in the "number of pilot blocks: medium" case), since the number of SD's is 3, scheduling section 118 allocates a transmission signal divided into three (three clusters) in the frequency domain separated by Δ1 and Δ2 respectively, as shown in the middle of FIG. 6. And when the number of pilot blocks is 12 (that is, in the "number of pilot blocks: large" case), since the number of SD's is 4, scheduling section 118 allocates a transmission signal divided into four (four clusters) in the frequency domain separated by Δ1, Δ2, and Δ3 respectively, as shown at the bottom of FIG. 6.

Thus, the larger the number of pilot blocks, the larger decision section 117 makes the number of SD's. However, channel estimation accuracy can be maintained regardless of whether the number of pilot blocks included in a transmission signal is "large," "medium," or "small," as shown in FIG. 6, and, since a transmission signal is divided at three-pilot-block intervals, regardless of the number of pilot blocks included in a transmission signal. That is to say, satisfactory channel estimation accuracy can be obtained within a coherent bandwidth even when the number of pilot blocks is small (as shown at the top of FIG. 6, for example), and when the number of pilot blocks is large (as shown at the bottom of FIG. 6, for example), since the number of SD's can be increased, a transmission signal can be allocated to a wider frequency band while maintaining satisfactory channel estimation accuracy within a coherent bandwidth. The present invention is not limited to a transmission signal being divided at three-pilot-block intervals—that is, to the number of pilot blocks included in each cluster being made three. Also, in the present invention, the number of pilot blocks included in each cluster may be made to differ.

With division pattern C shown in FIG. 4, the larger the number of pilot blocks, the larger decision section 117 makes the number of SD's, in the same way as with division pattern B. However, comparing division pattern C and division pattern B, the number of SD's in the same number of pilot blocks is larger in division pattern C than in division pattern B. Specifically, the numbers of SD's corresponding to "small," "medium," and "large" numbers of pilot blocks respectively are 3, 4, and 5 in division pattern C as opposed to 2, 3, and 4 in division pattern B. Here, a case has been described in which base station 100 and terminal 200 use three division patterns—division pattern A, division pattern B, and division pattern C—but the number of division patterns used in the present invention is not limited to three. For example, base station 100 and terminal 200 may use only two division patterns—division pattern A and division pattern B—or may use four division patterns—division pattern A, division pattern B, division pattern C, and division pattern D.

Reception quality between base station 100 and terminal 200 changes according to frequency-domain channel fluctuation caused by delay spread or a Doppler frequency, for instance. For example, when frequency-domain channel fluctuation is mild, good reception quality can be obtained over a wide range of consecutive frequency bands (that is, the coherent bandwidth is wide). On the other hand, when frequency-domain channel fluctuation is severe, good reception quality cannot be obtained over a wide range of consecutive frequency bands (that is, the coherent bandwidth is narrow). Therefore, it is desirable for different numbers of SD's to be decided upon according to channel fluctuation between base station 100 and terminal 200. Specifically, the more severe the frequency-domain channel fluctuation (the narrower the coherent bandwidth), the narrower is the continuous frequency band in which good reception quality can be obtained, and therefore the larger the number of SD's should be made.

Thus, decision section 117 uses one or another of division pattern A, division pattern B, and division pattern C shown in FIG. 4 according to channel fluctuation between base station 100 and terminal 200.

Channel fluctuation caused by delay spread will now be described as an example of channel fluctuation between base station 100 and terminal 200. First, decision section 117 sets threshold value 1 and threshold value 2 (where threshold value 1<threshold value 2), for example, beforehand. Then, for example, decision section 117 decides the number of SD's using division pattern A shown in FIG. 4 if the delay spread is less than threshold value 1 (if channel fluctuation is mild), decides the number of SD's using division pattern B shown in FIG. 4 if the delay spread is greater than or equal to threshold value 1 but less than threshold value 2, or decides the number of SD's using division pattern C shown in FIG. 4 if the delay spread is greater than or equal to threshold value 2 (if channel fluctuation is severe).

By this means, for example, when channel fluctuation is mild (when the delay spread is less than threshold value 1), base station 100 can allocate pilot blocks to a wide range of consecutive frequency bands (coherent bandwidth) with good reception quality by deciding the number of SD's to be 1. Also, when channel fluctuation is severe (when the delay spread is greater than or equal to threshold value 2), good reception quality can only be obtained in a narrow consecutive frequency band range. Thus, by making the number of SD's larger, base station 100 can divide pilot blocks more finely, and can allocate pilot blocks to each bandwidth for which good reception quality can be obtained (coherent bandwidth).

Generation section 119 identifies a division pattern used by decision section 117 to decide the number of SD's based on the number of pilot blocks indicated by pilot block number information and the number of SD's decided by decision section 117. For example, if the number of pilot blocks is 9 ("number of pilot blocks: medium") and the number of SD's is 3, generation section 119 refers to the associations shown in FIG. 4, and identifies the fact that the division pattern used by decision section 117 to decide the number of SD's is division pattern B. Then generation section 119 generates division information indicating the identified division pattern (here, division pattern B), and outputs this division information to encoding section 101. By this means, the division pattern used by decision section 117 to decide the number of SD's is reported to terminal 200.

On the other hand, division number determination section 205 of terminal 200 determines the number of SD's of a transmission signal of this terminal by referring to the associations between the number of pilot blocks and number of SD's shown in FIG. 4 based on division information reported from base station 100 and a frequency bandwidth (that is, number of pilot blocks) allocated to this terminal requested by "Grant." For example, if the division pattern indicated by division information is division pattern A and the number of pilot blocks requested from the frequency band indicated by "Grant" is 6 (that is, "number of pilot blocks: small"), division number determination section 205 determines the number of SD's to be 1 from the association shown in FIG. 4. Similarly, if, for example, the division pattern indicated by division information is division pattern B and the number of pilot blocks requested from the frequency band indicated by "Grant" is 6 (that is, "number of pilot blocks: small"), division number determination section 205 determines the number of SD's to be 2 from the association shown in FIG. 4. The same procedure also applies to the other division pattern and the other numbers of pilot blocks.

Thus, according to this embodiment, the larger the number of pilot blocks included in a transmission signal, the larger a base station makes the number of SD's. By this means, when the number of pilot blocks is small, the channel estimation accuracy of a divided transmission signal can be maintained, and when the number of pilot blocks is large, the frequency diversity effect can be further improved. Therefore, according to this embodiment, a frequency diversity effect can be improved while maintaining channel estimation accuracy, regardless of the number of SD's.

Furthermore, according to this embodiment, a base station and a terminal hold a plurality of division patterns for which the association between the number of pilot blocks and the number of SD's differs. Then the base station decides a different number of SD's according to channel fluctuation between the base station and the terminal, even when the number of pilot blocks included in a transmission signal is the same. By this means, the terminal can divide a transmission signal so that each cluster comprises the number of pilot blocks according to a coherent bandwidth that differs according to the magnitude of channel fluctuation. Also, the base station need only report the division pattern used to decide the number of SD's to the terminal, and the terminal can determine the number of SD's of a transmission signal of that terminal based on the reported division pattern.

In this embodiment, a case has been described in which a "small," "medium," or "large" number of pilot blocks is set based on the actual number of pilot blocks. However, in the present invention, a "small," "medium," or "large" number of pilot blocks may also be set based on the proportion of frequency-band bandwidth occupied by all pilot blocks included in a transmission signal relative to the system bandwidth. For example, provision may be made for a case in which the proportion of frequency-band bandwidth occupied by pilot blocks is less than ⅓ of the system bandwidth to be categorized as "number of pilot blocks: small," a case in which the proportion is greater than or equal to ⅓ and less than ⅔ of the system bandwidth to be categorized as "number of pilot blocks: medium," and a case in which the proportion is greater than or equal to ⅔ of the system bandwidth to be categorized as "number of pilot blocks: large."

Also, in this embodiment, a case has been described in which numbers of pilot blocks are classified into three categories: small, medium, and large. However, the present invention is not limited to this, and, for example, numbers of pilot blocks may also be classified into two categories: small and large. For example, a case in which the proportion of frequency-band bandwidth occupied by pilot blocks is less than ½ of the system bandwidth may be categorized as "number of pilot blocks: small," while a case in which the proportion is greater than or equal to ½ of the system bandwidth is categorized as "number of pilot blocks: large."

In this embodiment, it has been stated that "the larger the number of pilot blocks, the larger the number of divisions is made" (or, "the number of divisions is increased in proportion to the number of pilot blocks"), but this may be replaced by "the larger the number of pilot blocks, the larger the maximum number of divisions is made" (or, "the maximum number of divisions is increased in proportion to the number of pilot blocks"). Also, "number of divisions" may be replaced by "data signal transmission bandwidth."

(Embodiment 2)

In this embodiment, in addition to deciding the number of SD's according to the number of pilot blocks as in Embodiment 1, a base station also decides a frequency interval between a plurality of clusters generated by dividing a transmission signal.

As in Embodiment 1, decision section 117 (FIG. 3) of base station 100 in this embodiment increases the number of SD's in proportion to the number of pilot blocks included in a transmission signal. Furthermore, if, for example, the number of pilot blocks included in a transmission signal is smaller than a threshold value, decision section 117 decides a frequency interval between a plurality of clusters generated by dividing a transmission signal to be one of a preset plurality of candidates.

In the following description, numbers of pilot blocks are classified into three categories: small, medium, and large. Also, the "number of pilot blocks: small" case is assumed to be a case in which the number of pilot blocks is smaller than a threshold value. Therefore, in the following description, only the "number of pilot blocks: small" case is described. Also, associations between the number of pilot blocks, number of SD's, and frequency interval $\Delta$ are stored beforehand by decision section 117 of base station 100 (FIG. 3) and division number determination section 205 of terminal 200 (FIG. 5).

In FIG. 7, in the case of signal #1, the number of SD's is 1 (that is to say, SC transmission with no division of a transmission signal is performed), as in the case of division pattern A of Embodiment 1 (FIG. 4). Therefore, in the case of signal #1, frequency interval $\Delta$ is not set. In the case of signal #2 and signal #3 shown in FIG. 7, the number of SD's is 2. Frequency interval $\Delta$ between two clusters generated by dividing a transmission signal into two is A [RB] in the case of signal #2 shown in FIG. 7, and B [RB] in the case of signal #3 shown in FIG. 7 (where B>A).

If the number of pilot blocks is smaller than a threshold value (here, the "number of pilot blocks: small" case), decision section 117 decides a frequency interval between a plurality of clusters generated by dividing a transmission signal to be one of a plurality of frequency interval candidates, based on channel fluctuation (for example, channel fluctuation caused by delay spread) between the base station and terminal 200.

Specifically, when channel fluctuation is mild, decision section 117 decides the number of SD's to be 1 using signal #1. By this means, scheduling section 118 can allocate pilot blocks to a wide range of consecutive frequency bands (coherent bandwidth) with good reception quality.

When decision section 117 makes the number of SD's 2, decision section 117 decides frequency interval $\Delta$ between two clusters to be either A (signal #2) or B (signal #3) according to channel fluctuation between the base station and terminal 200. Specifically, if the channel quality of both clusters is good when frequency interval $\Delta$=A, whereas the channel quality of only one of the clusters is good when frequency interval $\Delta$=B, decision section 117 decides frequency interval $\Delta$ to be A using signal #2. Similarly, if the channel quality of only one of the clusters is good when frequency interval $\Delta$=A, whereas the channel quality of both clusters is good when frequency interval $\Delta$=B, decision section 117 decides frequency interval Δ to be B using signal #3. Then decision section 117 outputs the decided number of SD's and frequency interval Δ to scheduling section 118. That is to say, decision section 117 changes the frequency interval between a plurality of clusters according to channel fluctuation.

Figure 8A:
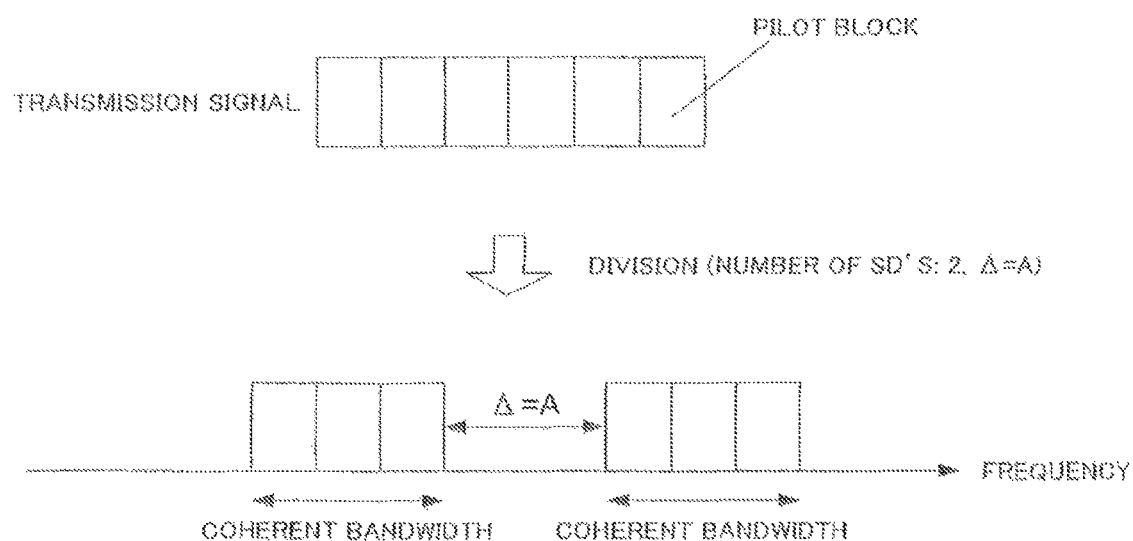
FIG. 8A is a drawing showing transmission signal division processing according to Embodiment 2 of the present invention.
Figure 8B:
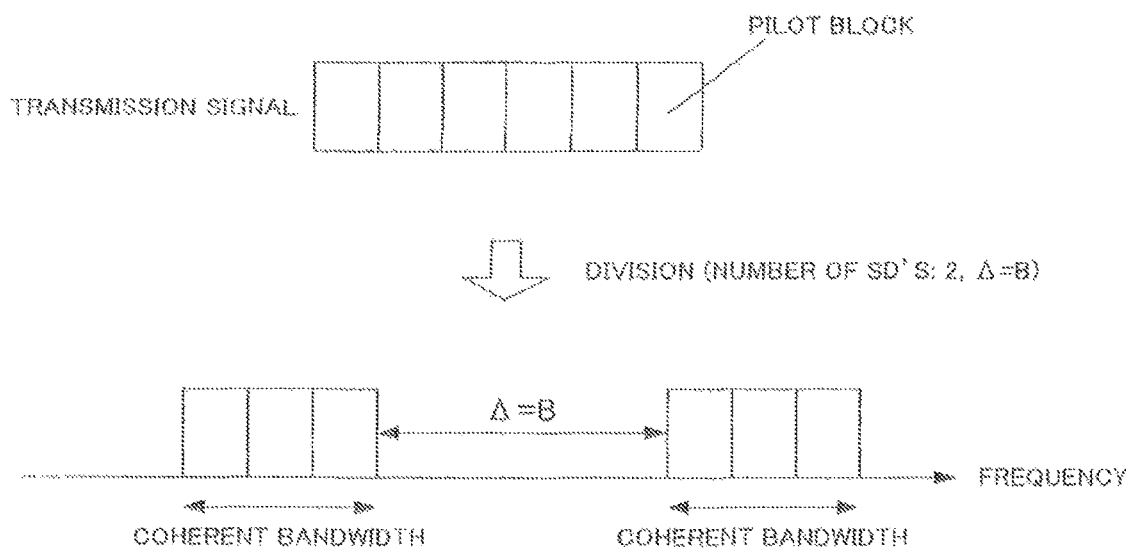
FIG. 8B is a drawing showing transmission signal division processing according to Embodiment 2 of the present invention.

When the number of SD's=2 and frequency interval Δ=A, scheduling section 118 allocates two clusters generated by dividing a transmission signal into two to frequency bands separated by frequency interval Δ=A, as shown in FIG. 8A. When the number of SD's=2 and frequency interval Δ=B, scheduling section 118 allocates two clusters generated by dividing a transmission signal into two to frequency bands separated by frequency interval Δ=B (>A), as shown in FIG. 8B.

Generation section 119 identifies a signal used by decision section 117 to decide the number of SD's and frequency interval Δ from among signals #1 through #3 shown in FIG. 7, based on the number of pilot blocks, and the number of SD's and frequency interval α decided by decision section 117. For example, when the number of pilot blocks is "small," the number of SD's is 2, and frequency interval Δ is B, generation section 119 refers to the associations shown in FIG. 7, and identifies the fact that the signal used by decision section 117 to decide the number of SD's and frequency interval Δ is signal #3. Then generation section 119 generates division information indicating the identified signal (here, signal #3). By this means, division information indicating that signal is reported from base station 100 to terminal 200.

On the other hand, division number determination section 205 of terminal 200 (FIG. 5) determines the number of SD's and frequency interval Δ of a transmission signal of this terminal by referring to the associations between the number of pilot blocks, number of SD's, and frequency interval Δ shown in FIG. 7 based on a signal (for example, one of signals #1 through #3 shown in FIG. 7) indicated by division information reported from base station 100 and a frequency-band bandwidth (that is, number of pilot blocks) allocated to this terminal requested by "Grant."

Thus, in the "number of pilot blocks: small" case, decision section 117 decides frequency interval Δ according to channel fluctuation. By this means, when the number of pilot blocks is small, frequency allocation can be performed flexibly by changing the frequency interval between a plurality of clusters according to channel fluctuation. Also, when the number of pilot blocks is small, although it is difficult to obtain a frequency diversity effect by arranging a plurality of clusters in a distributed fashion since the number of SD's is decreased, the frequency diversity effect can be improved by changing the frequency interval according to channel fluctuation.

Thus, according to this embodiment, a base station decides a frequency interval between a plurality of clusters generated by dividing a transmission signal to be one of a plurality of candidates even when the number of pilot blocks included in a transmission signal is small. By this means, a transmission signal can be allocated flexibly to a frequency band with good reception quality even when the number of pilot blocks included in a transmission signal is small. Therefore, according to this embodiment, channel estimation accuracy can be maintained regardless of the number of SD's in the same way as in Embodiment 1, and a frequency diversity effect can be improved to a greater degree than in Embodiment 1.

In this embodiment, the description has referred only to a "number of pilot blocks: small" case such as shown in FIG. 7. However, in the present invention, a plurality of frequency intervals may also be set as a frequency interval between a plurality of clusters generated by division of a transmission signal for a number of pilot blocks in other than the "number of pilot blocks: small" case (for example, for a "medium" or "large" number of pilot blocks).

(Embodiment 3)

In LTE-Advanced, MIMO (Multiple Input Multiple Output) transmission of a data signal has been studied. More specifically, support has been studied for MIMO whereby one terminal transmits a data signal from a plurality of antenna ports at the same time and at the same frequency, and a data signal is space-multiplexed in space using a virtual channel (hereinafter referred to as "layer").

Here, an antenna port denotes a logical antenna (antenna group) comprising one or a plurality of physical antennas. That is to say, an antenna port does not necessarily denote one physical antenna, but may denote an array antenna or the like comprising a plurality of antennas. For example, an antenna port may comprise a plurality of physical antennas, and may be stipulated as a minimum unit whereby a base station or terminal can transmit a different pilot signal. Also, an antenna port may be stipulated as a minimum unit for multiplication by a precoding vector weight.

Figure 9:
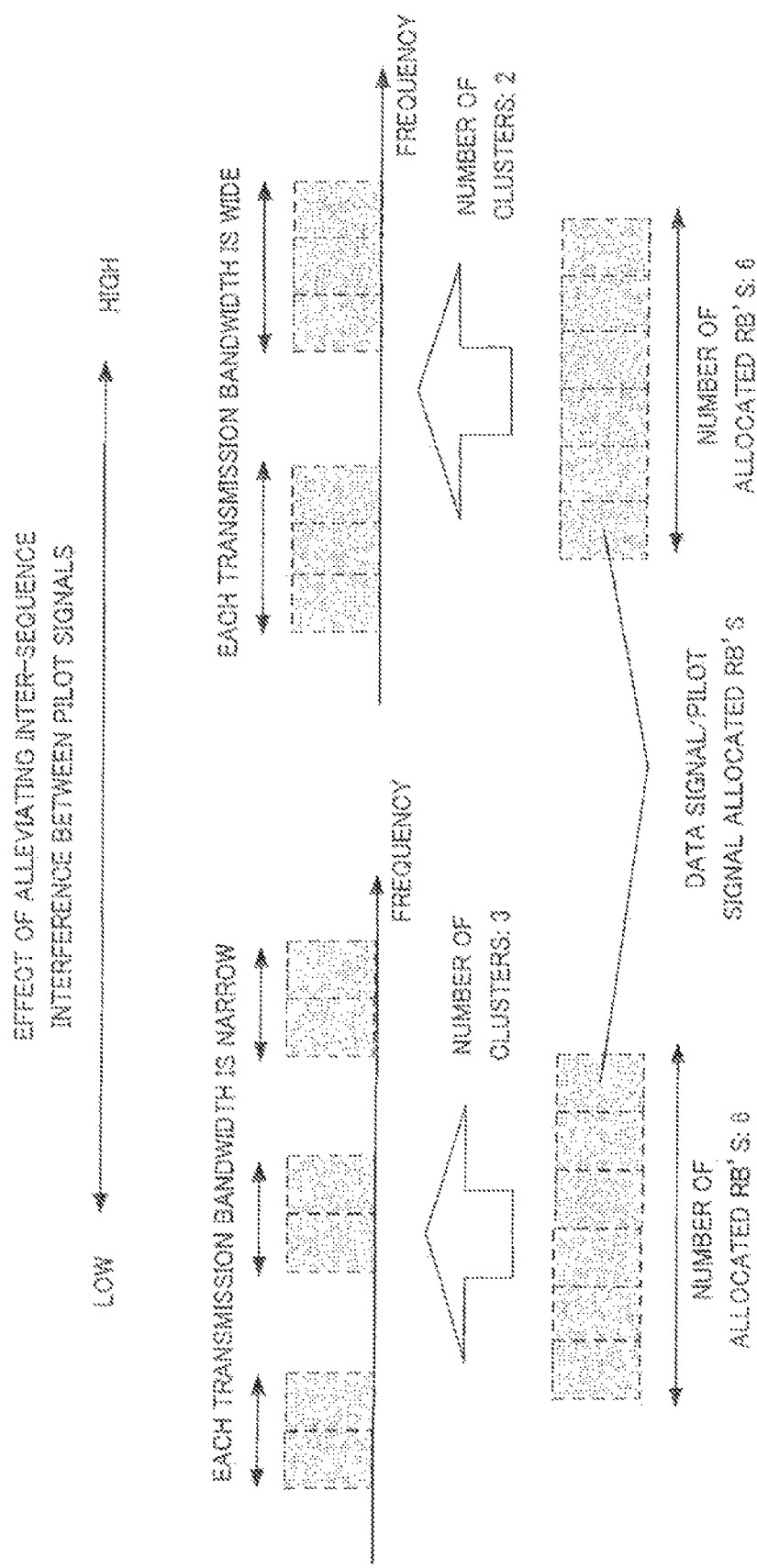
FIG. 9 is a drawing showing how inter-sequence interference between pilot signals in a cell increases.

In this MIMO transmission, when the number of layers—that is, the degree of space multiplexing—increases, data signals transmitted at the same frequency increase, and interference between data signals consequently increases. Also, when the number of clusters increases, continuous bandwidth allocated to each terminal decreases, and an effect of alleviating inter-sequence interference between pilot signals is reduced. For example, in an actual environment, inter-sequence interference occurs even between orthogonal sequences, and therefore inter-sequence interference between pilot signals in a cell increases (see FIG. 9). This is particularly marked in a narrow band. That is to say, when the number of layers is large and the cluster bandwidth is narrow, data signal reception quality falls.

Thus, in this embodiment, a case is described in which the number of layers is large and the cluster bandwidth is narrow in MIMO transmission.

Figure 10:
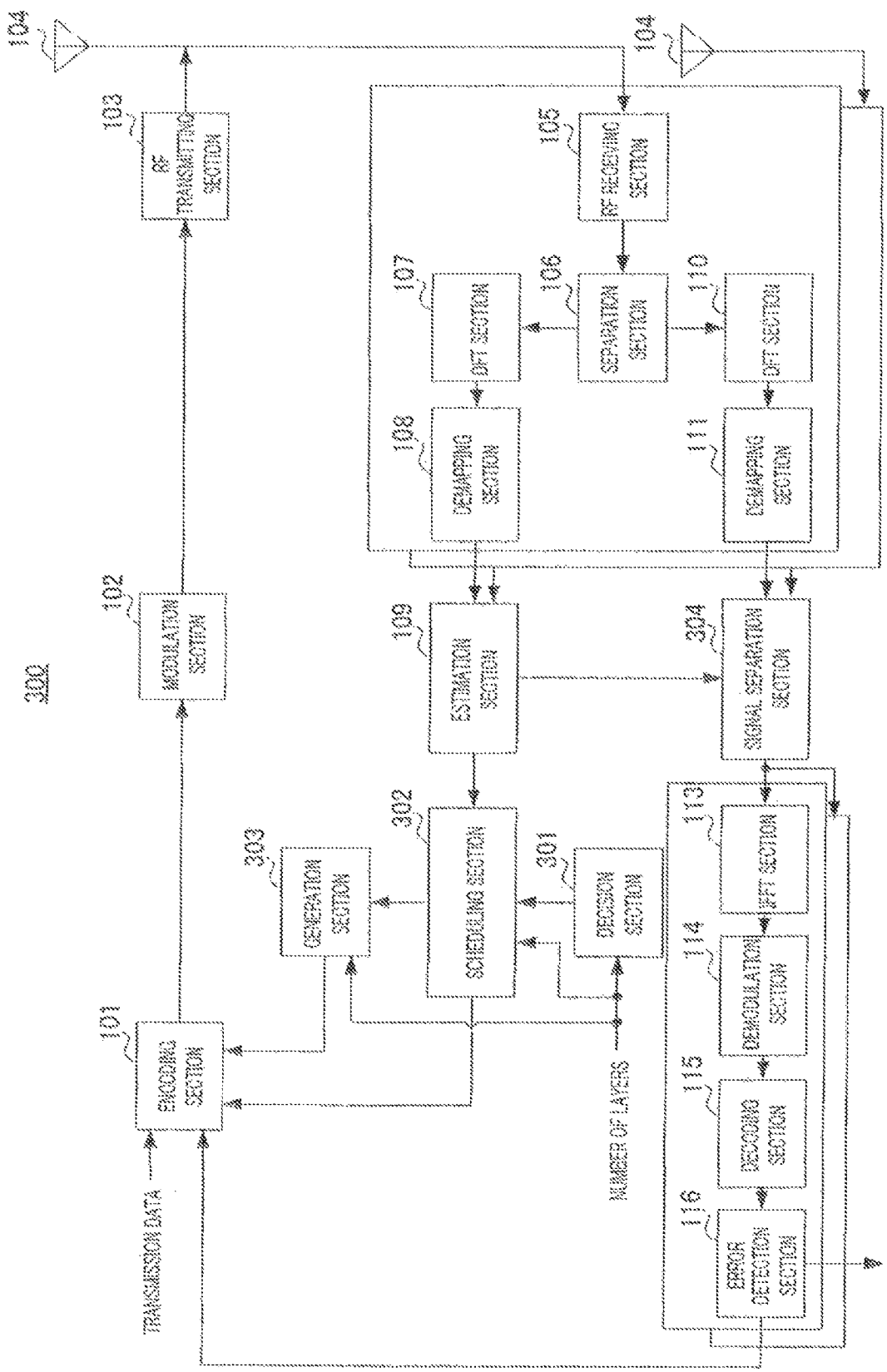
FIG. 10 is a block diagram showing the configuration of a base station according to Embodiments 3 and 4 of the present invention.

The configuration of base station 300 according to this embodiment will now be described using FIG. 10. Only points of difference from the configuration shown in FIG. 3 of Embodiment 1 will be described here. FIG. 10 differs from FIG. 3 in that decision section 117 has been changed to decision section 301, scheduling section 118 to scheduling section 302, generation section 119 to generation section 303, and frequency domain equalization section 112 to signal separation section 304.

The number of layers to be allocated to each terminal is input to decision section 301, and decision section 301 increases or decreases the cluster minimum bandwidth allocated to each terminal according to the number of layers in MIMO transmission. That is to say, decision section 301 decides the cluster minimum bandwidth allocated to each terminal according to an input number of layers, and outputs the cluster minimum bandwidth to scheduling section 302. For example, decision section 301 decides the cluster minimum bandwidth to be 1 RB if the number of layers is small, or decides the cluster minimum bandwidth to be 3 RB's if the number of layers is large, and outputs the cluster minimum bandwidth to scheduling section 302.

Scheduling section 302 allocates a transmission band in each layer to a terminal based on the number of layers allocated to each terminal, a cluster minimum bandwidth dependent upon the number of layers output from decision section 301, and reception quality output from estimation section 109, and outputs the allocation result to encoding section 101 and generation section 303. Here, the cluster bandwidth of each terminal is allocated so as to be greater than or equal to the input cluster minimum bandwidth. For example, assuming a system bandwidth of 12 RB's, whether or not an RB is allocated to a terminal is scheduled for each RB when the number of layers is small, whereas whether or not allocation is performed to a terminal is scheduled in 3-RB units when the number of layers is large. That is to say, if a case in which a base is allocated is denoted by 1, and a case in which a base is not allocated is denoted by 0, [111000000111] is given by a case in which the number of layers is small, while [1001] is given by a case in which the number of layers is large, based on representation in 3-unit groups. At this time, the cluster minimum bandwidth is 1 RB when the number of layers is small, and the cluster minimum bandwidth is 3 RB's when the number of layers is large. Provision may also be made for the same transmission band to be allocated in each layer.

Generation section 303 stores relationships between numbers of layers and transmission band allocation units, decides a transmission band allocation unit based on an input number of layers, generates transmission band information of each terminal for a transmission band of each terminal input from scheduling section 302 using that allocation unit, and outputs the transmission band information to encoding section 101. Thus, generation section 303 generates transmission band information according to the number of layers, with, for example, transmission band information being generated in 1-RB units when the number of layers is small, and transmission band information being generated in 3-RB units when the number of layers is large. Assuming a system bandwidth of 12 RB's, whether or not allocation is performed to a terminal in each RB is indicated by 12 bits when the number of layers is small, whereas whether or not allocation is performed to a terminal in 3-RB units is indicated by 4 bits when the number of layers is large. That is to say, when the number of layers is small, the representation is [111000000111], whereas when the number of layers is large, the representation is [1001] in 3-unit groups.

Signal separation section 304 finds a weight by which a data signal received by each antenna is to be multiplied, using a channel frequency fluctuation estimate input from estimation section 109, multiplies a data signal input from demapping section 111 by the weight, and performs separation into data signals of each layer. The separated data signals of each layer are output to IFFT section 113.

Figure 11:
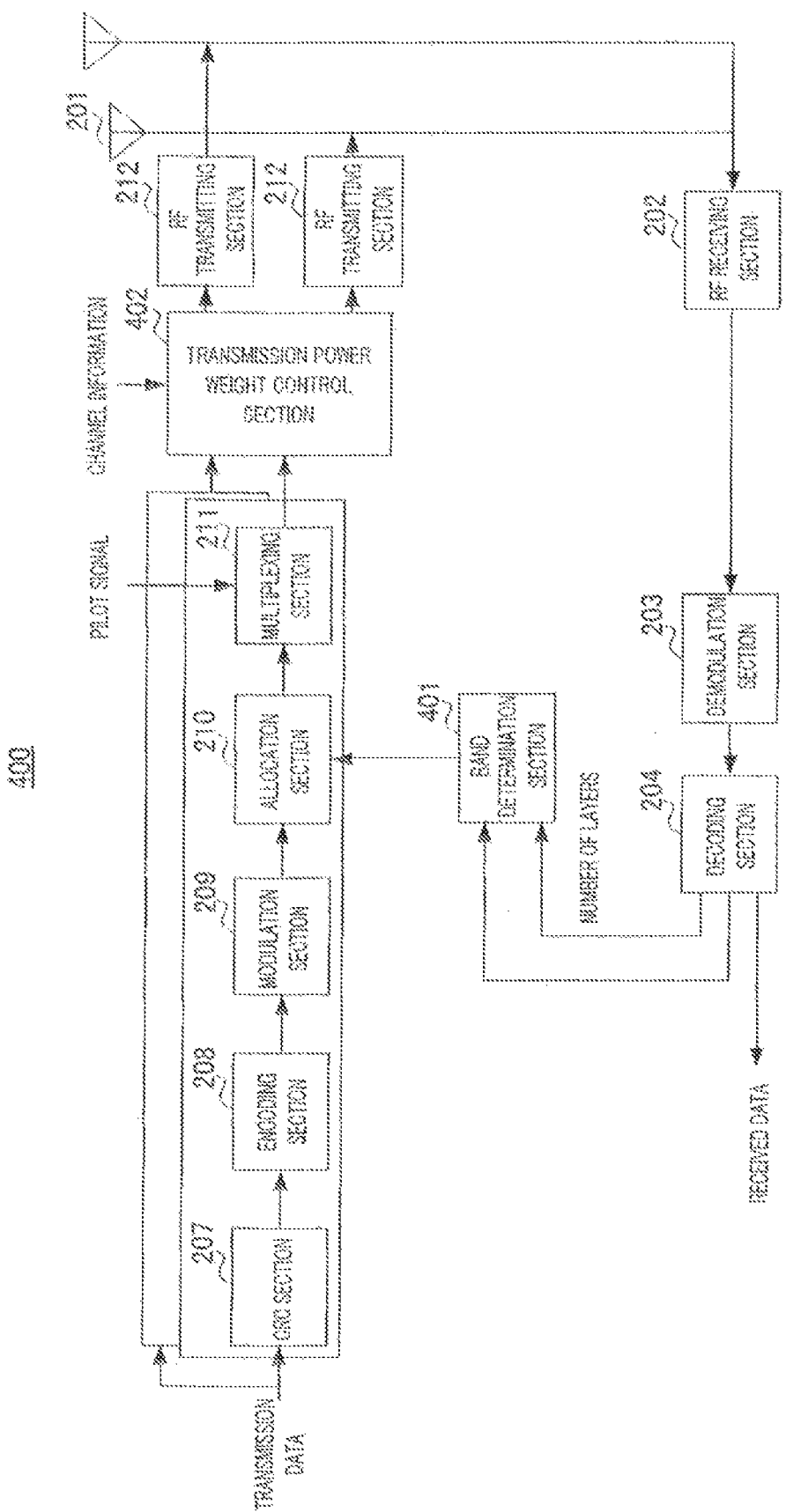
FIG. 11 is a block diagram showing the configuration of a terminal according to Embodiments 3 and 4 of the present invention.

Next, the configuration of terminal 400 according to this embodiment will be described using FIG. 11. Only points of difference from the configuration shown in FIG. 5 of Embodiment 1 will be described here. FIG. 11 differs from FIG. 5 in that division number determination section 205 has been eliminated, band determination section 206 has been changed to band determination section 401, and transmission power weight control section 402 has been added.

Band determination section 401 stores relationships between numbers of layers and transmission band allocation units, determines a transmission band allocation unit using the number of layers output from decoding section 204, finds a cluster transmission band from the transmission band allocation unit, and outputs this to allocation section 210. That is to say, band determination section 401 determines a transmission band allocation unit using the number of layers based on a relationship whereby a cluster minimum bandwidth allocated to each terminal is increased or decreased according to the number of layers in MIMO transmission.

For example, band determination section 401 determines that transmission band information has been generated in 1-RB units when the number of layers is small, and that transmission band information has been generated in 3-RB units when the number of layers is large. Assuming a system bandwidth of 12 RB's, band determination section 401 determines that whether or not allocation is performed to a terminal in each RB has been indicated by 12 bits when the number of layers is small, whereas whether or not allocation is performed to a terminal in 3-RB units has been indicated by 4 bits when the number of layers is large.

Transmission power weight control section 402 decides transmission power and a weight using input channel information, multiplies information output from multiplexing section 211 by a transmission power weight, and outputs the result to RF transmitting section 212.

Figure 12A:
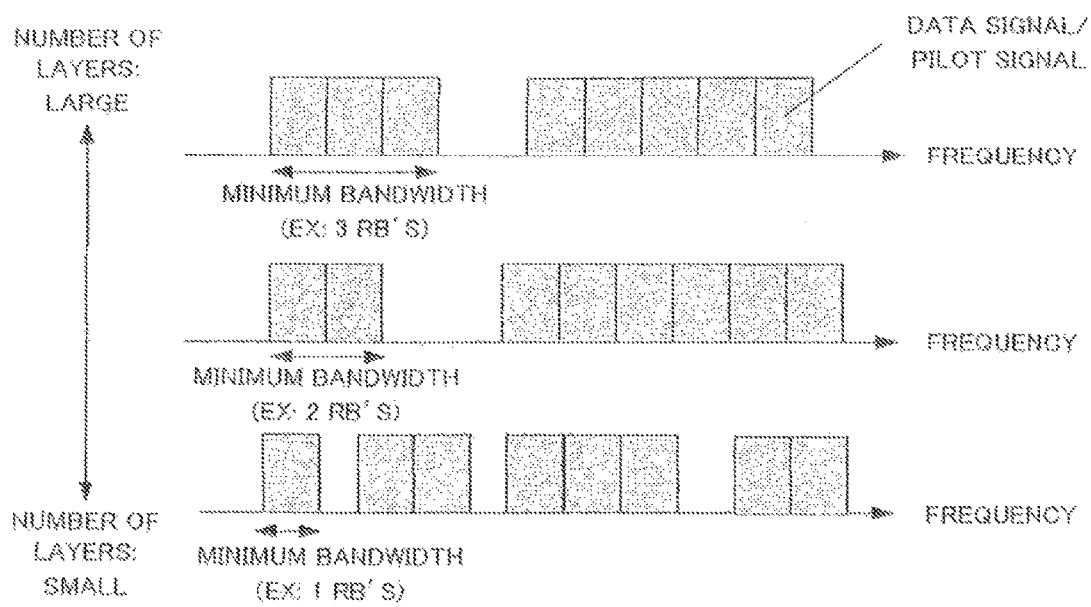
FIG. 12A is a drawing showing how the minimum bandwidth of a cluster allocated to each terminal is increased according to the number of layers in MIMO transmission.
Figure 12B:
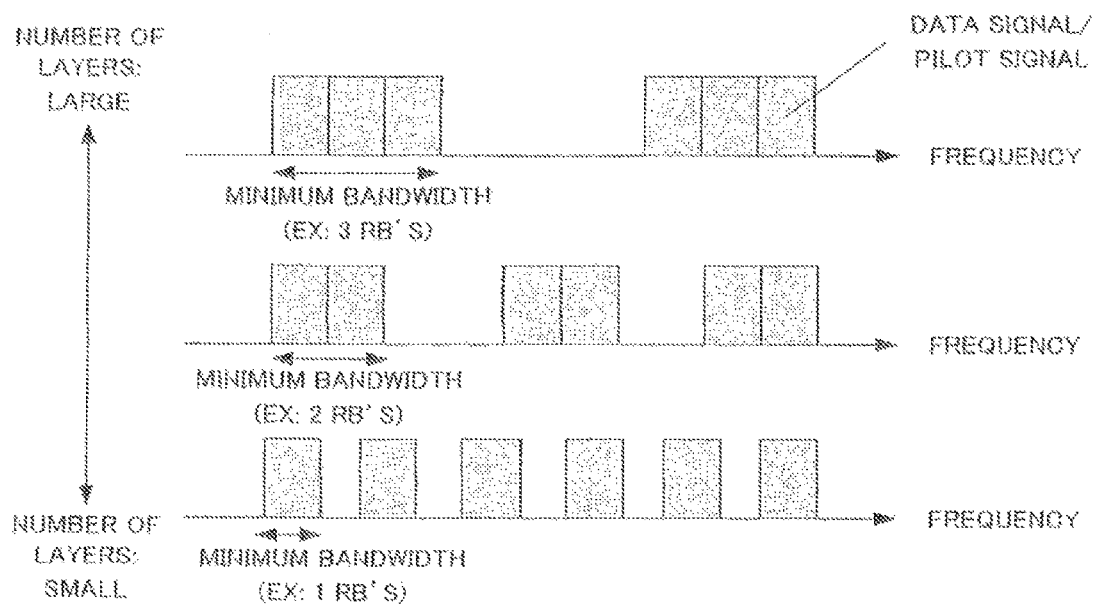
FIG. 12B is a drawing showing how the minimum bandwidth of a cluster allocated to each terminal is increased according to the number of layers in MIMO transmission.

The way in which a cluster minimum bandwidth allocated to each terminal is increased or decreased according to the number of layers in MIMO transmission will now be described using FIG. 12. FIG. 12A shows a case in which cluster bandwidth is allocated uniformly, and FIG. 12B shows a case in which cluster bandwidth is allocated non-uniformly. In both cases, a transmission band is allocated with the cluster minimum bandwidth as 1 RB when the number of layers is small, and with the cluster minimum bandwidth as 3 RB's when the number of layers is large.

The reason for making the cluster minimum bandwidth narrow when the number of layers is small in this way is that, if the number of layers is small, interference between data signals is small, and consequently, even if channel estimation accuracy is lowered compared with a case in which the number of layers is large, reception quality can be maintained at equal or better, or close, reception quality. That is to say, when the number of layers is small, data signal reception quality can be maintained at reception quality equal to or better than, or close to, that when the number of layers is large while improving the frequency diversity effect or flexibility of allocation by making the cluster minimum bandwidth narrow.

On the other hand, the reason for making the cluster minimum bandwidth wide when the number of layers is large is that high channel estimation accuracy is required in order to obtain a certain reception quality when the number of layers is large.

Thus, according to this embodiment, a base station increases or decreases the cluster minimum bandwidth allocated to each terminal according to the number of layers in MIMO transmission. By this means, channel estimation accuracy is lowered and the frequency diversity effect can be improved when the number of layers is small. On the other hand, the frequency diversity effect is decreased and channel estimation accuracy can be improved when the number of layers is large. Thus, data signal reception quality can be maintained at a certain level or above whether the number of layers is large or small.

In this embodiment, a case has been described in which the cluster minimum bandwidth allocated to each terminal is increased or decreased according to the number of layers in MIMO transmission, but the present invention may also provide for the cluster minimum bandwidth allocated to each terminal to be increased as transmission bandwidth increases or the number of clusters increases in MIMO transmission.

For example, in FIG. 13, the cluster minimum bandwidth is made 1 RB when the transmission bandwidth is 2 RB's to 20 RB's and the number of layers is 1, and the cluster minimum bandwidth is increased to 4 RB's when the transmission bandwidth is 2 RB's to 20 RB's and the number of layers is increased to 4. Also, when the number of layers is 1 and the cluster minimum bandwidth is increased to 51 RB's to 100 RB's, the cluster minimum bandwidth is increased to 5 RB's. Furthermore, when the cluster minimum bandwidth is increased to 51 RB's to 100 RB's and the number of layers is increased to 4, the cluster minimum bandwidth is increased to 8 RB's. By this means, data signal reception quality can be maintained at a certain level or above even when the number of layers is large, and the frequency diversity effect can be improved.

In this embodiment, a case has been described in which a data signal and pilot signal are allocated to nonconsecutive bands, but the present invention is not limited to this, and can also be applied to a case in which a data signal and pilot signal are allocated to consecutive bands (the number of clusters being 1—that is, single-carrier transmission). That is to say, the cluster minimum bandwidth may also be increased as the number of layers increases. For example, the minimum bandwidth may be made 1 RB when the number of layers is 1, and 2 RB's when the number of layers is 2.

(Embodiment 4)

A base station according to Embodiment 4 of the present invention is the same as that shown in FIG. 10 of Embodiment 3, and therefore FIG. 10 will be referred to here, and only functions that differ from those of a base station according to Embodiment 3 will be described.

The number of layers to be allocated to each terminal is input to decision section 301, and decision section 301 increases or decreases the maximum number of clusters allocated to each terminal according to the number of layers in MIMO transmission. That is to say, decision section 301 decides the maximum number of clusters allocated to each terminal according to an input number of layers, and outputs the maximum number of clusters allocated to each terminal to scheduling section 302.

Scheduling section 302 allocates a transmission band in each layer to a terminal based on the number of layers allocated to each terminal, a maximum number of clusters allocated to each terminal dependent upon the number of layers output from decision section 301, and reception quality output from estimation section 109, and outputs the allocation result to encoding section 101 and generation section 303. Here, transmission band allocation is performed so that the number of clusters of each transmission band is less than or equal to an input cluster maximum value. For example, scheduling is performed so that the number of clusters is not more than 6 when the number of layers is small, whereas scheduling is performed so that the number of clusters is not more than 3 when the number of layers is large. Provision may also be made for the same transmission band to be allocated in each layer.

Generation section 303 stores relationships between numbers of layers and maximum numbers of clusters, and decides a maximum number of clusters based on an input number of layers. Generation section 303 generates transmission band information of each terminal for a transmission band of each terminal input from scheduling section 302 using a decided maximum number of clusters, and outputs cluster transmission band information to encoding section 101. Thus, generation section 303 generates transmission band information according to the number of layers, with, for example, transmission band information being generated with a maximum number of clusters of 6 when the number of layers is small, and transmission band information being generated with a maximum number of clusters of 3 when the number of layers is large. Assuming the number of bits for reporting to a terminal to be 30, the 30 bits are divided into six and a band is reported using 5 bits per cluster when the number of layers is small, whereas the 30 bits are divided into three and a band is reported using 10 bits per cluster when the number of layers is large.

A terminal according to Embodiment 4 of the present invention is the same as that shown in FIG. 11 of Embodiment 3, and therefore FIG. 11 will be referred to here, and only functions that differ from those of a terminal according to Embodiment 3 will be described.

Band determination section 401 stores relationships between numbers of layers and maximum numbers of clusters, determines a maximum number of clusters using the number of layers output from decoding section 204, finds a cluster transmission band from the maximum number of clusters, and outputs this to allocation section 210. That is to say, band determination section 401 determines a maximum number of clusters using the number of layers based on a relationship whereby a maximum number of clusters allocated to each terminal is increased or decreased according to the number of layers in MIMO transmission. For example, band determination section 401 determines that transmission band information has been generated with a maximum number of clusters of 6 when the number of layers is small, and transmission band information has been generated with a maximum number of clusters of 3 when the number of layers is large. Assuming the number of bits for reporting to a terminal to be 30, band determination section 401 determines that the 30 bits have been divided into six and a band has been indicated using 5 bits per cluster when the number of layers is small, whereas band determination section 401 determines that the 30 bits have been divided into three and a band has been indicated using 10 bits per cluster when the number of layers is large.

Figure 14A:
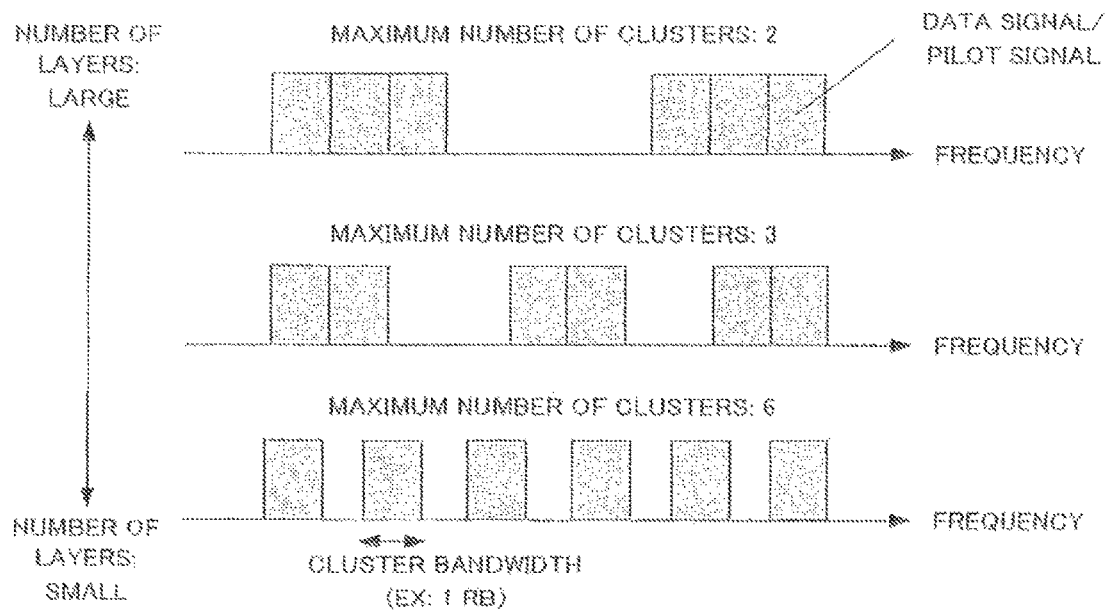
FIG. 14A is a drawing showing how the maximum number of clusters allocated to each terminal is increased according to the number of layers in MIMO transmission.
Figure 14B:
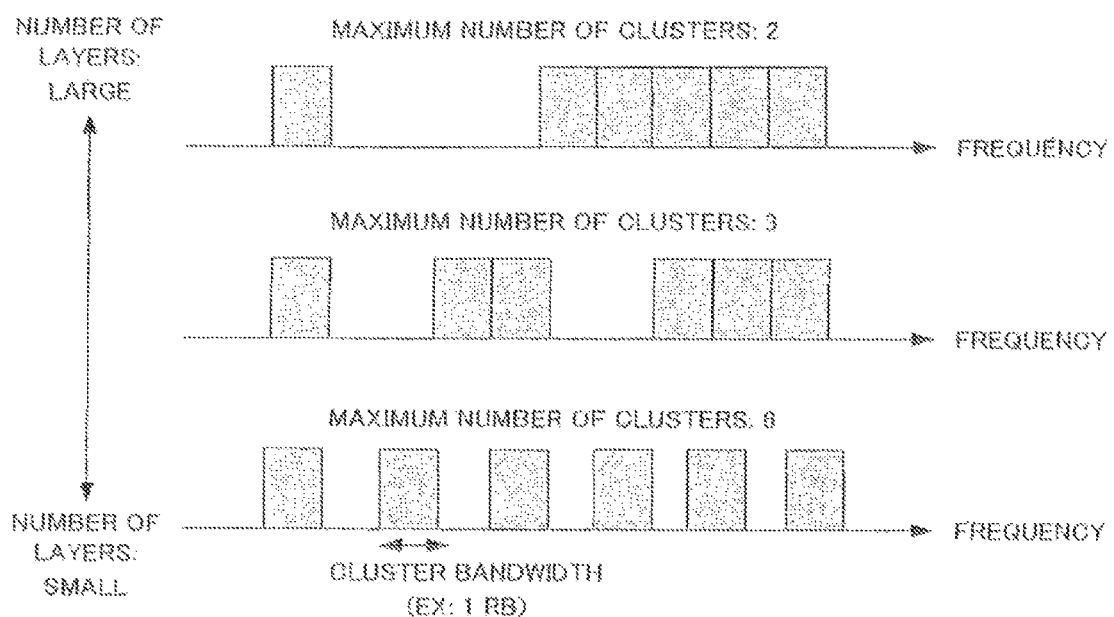
FIG. 14B is a drawing showing how the maximum number of clusters allocated to each terminal is increased according to the number of layers in MIMO transmission.

The way in which a maximum number of clusters allocated to each terminal is increased or decreased according to the number of layers in MIMO transmission will now be described using FIG. 14. FIG. 14A shows a case in which cluster bandwidth is allocated uniformly, and FIG. 14B shows a case in which cluster bandwidth is allocated non-uniformly. In FIG. 14, the maximum number of clusters is made 6 when the number of pilot blocks is small, and the maximum number of clusters is made 2 when the number of pilot blocks is large. In FIG. 14A, the transmission bandwidth of each cluster becomes wider, and thus channel estimation accuracy improves, as the number of clusters decreases. In FIG. 14B, clusters with a wide transmission bandwidth increase, and thus channel estimation accuracy improves, as the number of clusters decreases.

The reason for increasing the maximum number of clusters when the number of layers is small in this way is that, if the number of layers is small, interference between data signals is small, and consequently, even if channel estimation accuracy is lowered compared with a case in which the number of layers is large, reception quality can be maintained at equal or better, or close, reception quality. That is to say, when the number of layers is small, data signal reception quality can be maintained at reception quality equal to or better than, or close to, that when the number of layers is large while improving the frequency diversity effect or flexibility of allocation by making the maximum number of clusters larger.

On the other hand, the reason for decreasing the maximum number of clusters when the number of layers is large is that high channel estimation accuracy is required in order to obtain a certain reception quality when the number of layers is large.

Thus, according to this embodiment, a base station increases or decreases the maximum number of clusters allocated to each terminal according to the number of layers in MIMO transmission. By this means, channel estimation accuracy is lowered and the frequency diversity effect can be improved when the number of layers is small. On the other hand, the frequency diversity effect is decreased and channel estimation accuracy can be improved when the number of layers is large. Thus, data signal reception quality can be maintained at a certain level or above whether the number of layers is large or small.

Provision may also be made for the maximum number of clusters allocated to each terminal to be increased as transmission bandwidth increases or the number of clusters decreases in MIMO transmission. For example, as shown in FIG. 15, the maximum number of clusters is made two when the transmission bandwidth is 2 RB's to 20 RB's and the number of layers is 1, and the maximum number of clusters is decreased to 1 when the transmission bandwidth is 2 RB's to 20 RB's and the number of layers is increased to 4. Also, when the number of layers is 1 and the cluster minimum bandwidth is increased to 51 RB's to 100 RB's, the maximum number of clusters is increased to 6. By this means, data signal reception quality can be maintained at a certain level or above even when the transmission bandwidth is wide, and the frequency diversity effect can be improved.

(Embodiment 5)

In Embodiment 4 of the present invention, the relationship between the number of layers and a maximum number of clusters was described, whereas in Embodiment 5 of the present invention, the relationship between the number of layers and a transmitting method will be described. Specifically, a case in which the maximum number of clusters is small is taken to be when the maximum number of clusters is 1, and the transmitting method is made consecutive band allocation. Also, a case in which the maximum number of clusters is large is taken to be when the maximum number of clusters is a plurality, and either nonconsecutive band allocation or consecutive band allocation is selected as the transmitting method.

A base station according to Embodiment 5 of the present invention is the same as that shown in FIG. 10 of Embodiment 4, and therefore FIG. 10 will be referred to here, and only functions that differ from those of a base station according to Embodiment 4 will be described.

The number of layers to be allocated to each terminal is input to decision section 301, and decision section 301 decides the transmitting method to be used by each terminal according to the number of layers in MIMO transmission. That is to say, decision section 301 decides upon consecutive band allocation as the transmitting method when an input number of layers is small, and decides upon either nonconsecutive band allocation or consecutive band allocation as the transmitting method when an input number of layers is large, and outputs the decided transmitting method to scheduling section 302. As a method of selecting nonconsecutive band allocation or consecutive band allocation, there is a method whereby reception quality information is input from estimation section 109, and nonconsecutive band allocation is decided upon if reception quality is good, while consecutive band allocation is decided upon if reception quality is poor.

Scheduling section 302 allocates a transmission band in each layer to a terminal based on the number of layers allocated to each terminal, a transmitting method dependent upon the number of layers output from decision section 301, and reception quality output from estimation section 109, and outputs the allocation result to encoding section 101 and generation section 303. For example, when the number of layers is small, consecutive band allocation or nonconsecutive band allocation is input as a transmitting method, and scheduling is performed so that consecutive band allocation or nonconsecutive band allocation is used in accordance with that indication. On the other hand, when the number of layers is large, consecutive band allocation is input as a transmitting method, and scheduling is performed in accordance with that indication.

Generation section 303 stores relationships between numbers of layers and transmitting methods, and decides the transmitting method according to an input number of layers and information from the scheduling section. Generation section 303 generates transmission band information of each terminal for a transmission band of each terminal input from scheduling section 302 based on a decided transmitting method, and outputs transmission band information to encoding section 101. For example, when the number of layers is small, transmission band information is reported using a format for reporting transmission band information for consecutive band allocation in the case of consecutive band allocation, or using a format for reporting transmission band information for nonconsecutive band allocation in the case of nonconsecutive band allocation. On the other hand, when the number of layers is large, transmission band information is reported using a format for reporting transmission band information for consecutive band allocation.

A terminal according to Embodiment 5 of the present invention is the same as that shown in FIG. 11 of Embodiment 4, and therefore FIG. 11 will be referred to here, and only functions that differ from those of a terminal according to Embodiment 4 will be described.

Band determination section 401 stores relationships between numbers of layers and transmitting methods, determines a transmitting method using information in a format for reporting the number of layers and transmission band information output from decoding section 204, finds an allocated transmission band based on the transmitting method, and outputs this to allocation section 210. For example, when the number of layers is small, band determination section 401 determines that the transmitting method is either consecutive band allocation or nonconsecutive band allocation, and decides which it is based on information in a format for reporting transmission band information. When the number of layers is large, band determination section 401 determines that the transmitting method is consecutive band allocation. Band determination section 401 may also decide that the transmitting method is consecutive band allocation based on information in a format for reporting transmission band information. Then band determination section 401 finds an allocated transmission band based on the transmitting method decided here.

The reason for enabling nonconsecutive band allocation or consecutive band allocation to be selected as the transmitting method when the number of layers is small here is that, if the number of layers is small, interference between data signals is small, and consequently, even if channel estimation accuracy is lowered compared with a case in which the number of layers is large, reception quality can be maintained at equal or better, or close, reception quality. That is to say, when the number of layers is small, either further improving reception quality using consecutive band allocation, or emphasizing the frequency diversity effect or flexibility of allocation using nonconsecutive band allocation, can be selected, while maintaining data signal reception quality at a certain level or above.

On the other hand, the reason for using consecutive band allocation as the transmitting method when the number of layers is large is that high channel estimation accuracy is required in order to obtain a certain reception quality when the number of layers is large.

Thus, according to this embodiment, a base station selects a transmitting method to be used by each terminal according to the number of layers in MIMO transmission. By this means, channel estimation accuracy is lowered and the frequency diversity effect can be improved when the number of layers is small. On the other hand, the frequency diversity effect is decreased and channel estimation accuracy can be improved when the number of layers is large. Thus, data signal reception quality can be maintained at a certain level or above whether the number of layers is large or small.

This concludes a description of embodiments of the present invention.

In the above embodiments, cases have been described in which a base station decides the number of SD's based on the associations between the number of pilot blocks and number of SD's shown in FIG. 4 or FIG. 7. However, in the present invention, for example, the numbers of SD's shown in FIG. 4 may be made maximum values, and the number of SD's within such a maximum number of SD's may be selected. Specifically, in the "number of pilot blocks: small" case in division pattern B shown in FIG. 7, the maximum number of SD's may be taken to be 3, and 1, 2, or 3 may be decided upon as the number of SD's actually used. By this means, base station 100 can allocate a transmission signal divided into one of a plurality of candidate numbers of SD's within a maximum number of SD's according to the number of pilot blocks. Therefore, base station 100 can change the number of SD's based on the channel quality or the like of each terminal while maintaining channel estimation accuracy within a coherent bandwidth in the same way as in the above embodiments, enabling scheduling to be performed in a flexible manner.

In the present invention, in addition to the division patterns shown in FIG. 4 or signaling shown in FIG. 7, a base station may also report cluster transmission band (Y) information and cluster pilot block number (X) information, each equivalent in number to the number of SD's. For example, when the number of SD's is 3, the base station may report transmission bands Y1 through Y3 to which three clusters generated by dividing a transmission signal into three are to be allocated respectively, and numbers of pilot blocks X1 through X3 of the clusters, to a terminal, as shown in FIG. 16. Also, when X1 through X3 are the same and Y1 through Y3 are the same in FIG. 16, the base station need only report X1 and Y1 in addition to a division pattern shown in FIG. 4 or signaling shown in FIG. 7. The terminal can then perform allocation of transmission band Y1 and number of pilot blocks X1, repeated a number of times equivalent to the number of SD's, for a transmission signal to be transmitted by that terminal.

In the above embodiments, cases have been described in which a base station decides the number of SD's based on an association between the number of pilot blocks and the number of SD's (for example, the associations shown in FIG. 4 or FIG. 7). However, in the present invention, a base station may also use the result of dividing the number of pilot blocks by coefficient X as the number of SD's. Coefficient X is the number of consecutive RB's (or the number of subcarriers) at which sufficient channel estimation accuracy can be maintained within a coherent bandwidth. Here, coefficient X is a minimum unit of pilot blocks included in a cluster. For example, in the above embodiments, cases have been described in which satisfactory channel estimation accuracy can be obtained if there are three or more consecutive pilot blocks, and therefore X=3. Also, in LTE, the minimum transmission signal bandwidth is 1 RB (12 subcarriers), and therefore it is desirable for X to be made 12 subcarriers or more, for example.

A number of RB's (or subcarriers) equivalent to a remainder generated by dividing a number of pilot blocks by coefficient X (that is, {(number of pilot blocks) mod X}) may be allocated sequentially, 1 RB at a time, in order from the first cluster among a plurality of clusters generated by dividing a transmission signal. For example, when the number of pilot blocks is 14 RB's and X is 3 RB's, the number of SD's is 4 (=14/3), and the remainder is 2 (=14 mod 3). Therefore, 14 pilot blocks are first divided into four clusters of 3 (=X) RB, and then pilot blocks equivalent to the remainder, 2 RB's, are allocated 1 RB at a time, in order from the first cluster. Thus, the numbers of pilot blocks included in the clusters are 4 RB's, 4 RB's, 3 RB's, and 3 RB's.

In the above embodiments, cases have been described in which a base station decides the number of SD's based on the number of pilot blocks in which a pilot signal is included. However, in LTE, a pilot signal is transmitted in the same band as a data signal. Consequently, in the present invention, a base station may decide the number of SD's based on the number of blocks that include a data signal. Alternatively, a base station may decide the number of SD's based on the number of blocks in which not only a pilot signal, but also a data signal, is included.

In the above embodiments, cases have been described in which DFT-s-OFDM with SDC is used as a transmitting method to which the present invention is applied. However, a transmitting method to which the present invention is applied is not limited to DFT-s-OFDM with SDC, but may be any transmitting method capable of transmission using a nonconsecutive plurality of frequency bands.

In the above embodiments, examples have been given in which data and a pilot signal are transmitted in an uplink from a terminal to a base station, but the present invention can also be applied in a similar way in the case of transmission in a downlink from a base station to a terminal.

In the above embodiments, "layer" may be replaced by "codeword" or "stream."

In the above embodiments, a drop in overall flexibility of allocation can also be suppressed since flexibility of allocation is possessed by a terminal with a small number of layers.

In the above embodiments, a group of a consecutive plurality of subcarriers may also be made a cluster.

In the above embodiments, switching between Embodiment 3 and Embodiment 4 may be performed according to the number of RB's of a transmission band. For example, provision may be made for channel estimation accuracy to be maintained using Embodiment 3 when the transmission band is narrow, and for flexibility of allocation to be increased using Embodiment 4 when the transmission band is wide.

In the above embodiments, cases have been described in which the present invention is configured as hardware, but it is also possible for the present invention to be implemented by software.

The function blocks used in the descriptions of the above embodiments are typically implemented as LSIs, which are integrated circuits. These may be implemented individually as single chips, or a single chip may incorporate some or all of them. Here, the term LSI has been used, but the terms IC, system LSI, super LSI, and ultra LSI may also be used according to differences in the degree of integration.

The method of implementing integrated circuitry is not limited to LSI, and implementation by means of dedicated circuitry or a general-purpose processor may also be used. An FPGA (Field Programmable Gate Array) for which programming is possible after LSI fabrication, or a reconfigurable processor allowing reconfiguration of circuit cell connections and settings within an LSI, may also be used.

In the event of the introduction of an integrated circuit implementation technology whereby LSI is replaced by a different technology as an advance in, or derivation from, semiconductor technology, integration of the function blocks may of course be performed using that technology. The application of biotechnology or the like is also a possibility.

The disclosures of Japanese Patent Application No. 2008-269982, filed on Oct. 20, 2008, and Japanese Patent Application No. 2009-018285, filed on Jan. 29, 2009, including the specifications, drawings and abstracts, are incorporated herein by reference in their entirety.

INDUSTRIAL APPLICABILITY

The present invention is suitable for use in a mobile communication system or the like.

The invention claimed is:

1. A communication apparatus comprising:
   circuitry, which, in operation, allocates a plurality of frequency resources to a terminal, the plurality of frequency resources being inconsecutive in a frequency domain, each of the plurality of frequency resources being comprised of a number of consecutive resource block(s), each of which being a unit for allocating the plurality of frequency resources, and the plurality of frequency resources being used for transmission of an uplink signal by the terminal; and
   a transmitter, which, in operation, transmits, to the terminal, allocation information indicating the plurality of frequency resources that are allocated to the terminal, wherein:
   the number of consecutive resource blocks included in each of the plurality of frequency resources is equal to or greater than a first minimum number of resource block(s) in case of a first system bandwidth, and
   the number of consecutive resource blocks included in each of the plurality of frequency resources is equal to or greater than a second minimum number of resource block(s) in case of a second system bandwidth, the second minimum number being greater than the first minimum number, and the second system bandwidth being greater than the first system bandwidth.

2. The communication apparatus according to claim 1, wherein the first minimum number and the second minimum number are a coherent bandwidth.

3. The communication apparatus according to claim 1, wherein the first minimum number and the second minimum number are equal to or more than 12 subcarriers.

4. A communication method comprising:
   allocating a plurality of frequency resources to a terminal, the plurality of frequency resources being inconsecutive in a frequency domain, each of the plurality of frequency resources being comprised of a number of consecutive resource block(s), each of which being a unit for allocating the plurality of frequency resources, and the plurality of frequency resources being used for transmission of an uplink signal by the terminal; and
   transmitting, to the terminal, allocation information indicating the plurality of frequency resources that are allocated to the terminal, wherein:
   the number of consecutive resource blocks included in each of the plurality of frequency resources is equal to or greater than a first minimum number of resource block(s) in case of a first system bandwidth, and
   the number of consecutive resource blocks included in each of the plurality of frequency resources is equal to or greater than a second minimum number of resource block(s) in case of a second system bandwidth, the second minimum number being greater than the first minimum number, and the second system bandwidth being greater than the first system bandwidth.

5. The communication method according to claim 4, wherein the first minimum number and the second minimum number are a coherent bandwidth.

6. The communication method according to claim 4, wherein the first minimum number and the second minimum number are equal to or more than 12 subcarriers.

* * * * *